(12) United States Patent
Miura et al.

(10) Patent No.: US 7,052,572 B2
(45) Date of Patent: May 30, 2006

(54) METHOD FOR MANUFACTURING A STRUCTURE

(75) Inventors: Junji Miura, Tokyo (JP); Atsushi Harada, Tokyo (JP); Seiji Maruyama, Tokyo (JP); Eikatsu Yamaguchi, Tokyo (JP); Yasuhiro Toi, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 351 days.

(21) Appl. No.: 10/209,425

(22) Filed: Jul. 30, 2002

(65) Prior Publication Data

US 2003/0034588 A1 Feb. 20, 2003

(30) Foreign Application Priority Data

| Aug. 1, 2001 | (JP) | ............................. P2001-233762 |
| Sep. 3, 2001 | (JP) | ............................. P2001-265826 |
| Sep. 28, 2001 | (JP) | ............................. P2001-302175 |
| Dec. 20, 2001 | (JP) | ............................. P2001-387637 |

(51) Int. Cl.
B28B 7/03 (2006.01)

(52) U.S. Cl. ..................... 156/286; 264/258; 264/313; 264/324

(58) Field of Classification Search ............... 264/313, 264/320, 324, 258; 156/286
See application file for complete search history.

(56) References Cited

U.S. PATENT DOCUMENTS

| 4,704,240 A | 11/1987 | Reavely et al. |
| 4,755,341 A | 7/1988 | Reavely et al. |
| 4,828,639 A | 5/1989 | Aker et al. |
| 4,889,668 A | 12/1989 | Kemp |
| 4,940,563 A * | 7/1990 | Kromrey ..................... 264/257 |
| 4,983,341 A * | 1/1991 | Kromrey ..................... 264/102 |
| 5,051,224 A | 9/1991 | Donatelli et al. |
| 5,082,515 A * | 1/1992 | Cartier et al. ............... 156/212 |
| 5,102,604 A * | 4/1992 | Sidles et al. ................. 264/257 |
| 5,227,176 A * | 7/1993 | McIntyre-Major ....... 425/387.1 |
| 5,516,478 A | 5/1996 | Boszor |
| 5,817,269 A | 10/1998 | Younie et al. |

FOREIGN PATENT DOCUMENTS

| EP | 0 457 288 A2 | 11/1991 |
| JP | 58205730 | 11/1983 |

* cited by examiner

*Primary Examiner*—Sam Chuan Yao
*Assistant Examiner*—Barbara J. Musser
(74) *Attorney, Agent, or Firm*—Darby & Darby

(57) ABSTRACT

There is provided a method for manufacturing a structural body comprising: a structural body formation step of forming the structural body by combining a plurality of constituent members through a bonding adhesive; a closed space formation step of disposing the structural body into a pressurizing or heating unit, forming a closed space with at least one of the structural body and the pressurizing or heating unit, and charging an elastic body into the closed space; a hardening step of fixing or hardening the bonding adhesive through the elastic body by the pressurizing or heating unit; and a discharge step of discharging the elastic body from the closed space.

13 Claims, 19 Drawing Sheets

METHOD FOR MANUFACTURING A STRUCTURE

BACKGROUND OF THE INVENTION

1. Field of Invention

The present invention relates to a bonding method using spherical bodies made of silicon rubber.

The present invention also relates to a method for manufacturing a structure (structural body) with a closed space, and particularly relates to a method for manufacturing a structure with a closed space in which a structure with a closed space made of a fiber reinforced resin composite material is formed integrally by bonding without using any mechanically coupling unit such as rivets, so that the labor and cost for manufacturing can be reduced, and the manufacturing cycle can be accelerated.

The present invention also relates to a method for manufacturing a composite material stiffened panel, and particularly relates to a method for manufacturing a composite material stiffened panel by use of a flexible mandrel.

The present invention also relates to a method for manufacturing a structure with a closed space.

2. Description of Related Art

Various methods for bonding adherends with each other by use of a bonding adhesive have been heretofore proposed and put into practical use in various industries of transport equipment such as aircraft, automobiles, ships, and so on, or general industries. Bonding is generally carried out through the following steps: (1) a surface treatment step of carrying out surface treatment on bonded surfaces of adherends; (2) a bonding adhesive application (pasting) step of applying (pasting) a bonding adhesive onto the bonded surface of one of the adherends or the bonded surfaces of both of the adherends; (3) a lamination step of laminating the adherends to each other; (4) a retaining step of pressing the laminated adherends to thereby fix (retain) these adherends; and (5) a bonding adhesive hardening step of hardening the bonding adhesive by heating or curing.

Here, the retaining step (4) is an essential step for forming an optimal bonding adhesive layer and eliminating bubbles mixed into the bonding adhesive, and it is demanded for applying uniform pressure to the laminated adherends. The retaining step (4) is usually carried out in parallel with the bonding adhesive hardening step (5) until hardening of the bonding adhesive is completed. For example, when an aircraft component is manufactured, retaining and hardening of a bonding adhesive are carried out concurrently by use of a pressure vessel called an autoclave which can carry out pressurizing and heating. Alternatively, a C-clamp (see FIG. 26) or a pressing machine (see FIG. 27) is generally used for pressing.

Although the autoclave used in the process of manufacturing aircraft components was indeed effective in applying uniform pressure even to curved bonded surfaces of the components, the cost for constructing the equipment or the operation cost was high because the autoclave was large in scale and had a special structure. Accordingly, the autoclave was not suitable for bonding compact components with each other or for bonding general-purpose components with each other because the cost increased too much.

On the other hand, when a C-clamp 410 as shown in FIG. 26 was used, a pressurizing portion 411 applied pressure to only a part of adherends 430 so that uniform pressure could not be applied all over the adherends 430. In addition, when the pressure was applied, a bonding adhesive in the pressurized portion of the adherends 430 might be pressed and flow to the surroundings. When volume contraction occurred due to the hardening reaction of the bonding adhesive after then, the bonding adhesive in this pressurized portion might become thin so that sufficient bonding could not be obtained.

On the other hand, when the bonding adhesive was heated and hardened concurrently with pressing, a clamp arm 412 of the C-clamp 410 might be thermally expanded and the pressurizing portion 411 was moved in a direction opposite to the pressurization direction so that sufficient pressure was not applied to the adherends 430. In addition, although the pressurizing portion 411 was moved up and down by a screw or the like so as to apply pressure to the adherends 430, the magnitude of the pressure at that time (hereinafter referred to as "pressurizing value") was not known. Thus, suitable magnitude of pressure could not be applied in accordance with the adherends or the kind of bonding adhesive.

On the other hand, a pressing machine 420 as shown in FIG. 27 was effective in bonding adherends 430 with each other, when the bonding adherends 430 had planar bonded surfaces respectively. However, when adherends having curved bonded surfaces were bonded with each other, upper and lower pressure plates 421 and 422 had to be produced to match the curved bonded surfaces of the adherends 430. Thus, the manufacturing cost thereof increased.

By the way, Aircraft or space structures are desired to be structurally high in strength and light in weight from the point of view of special characteristics of application of the aircraft or space structures. To this end, when wings, enpennage, a fuselage, and so on, of an aircraft are formed, a semimonocoque structure by which a load mainly is applied to a shell member is adopted. Wings of an aircraft can be taken as representative examples of such a semimonocoque structure. A wing of an aircraft is constituted by a leading edge portion, a wing box and a trailing edge portion. Of them, the inter-spar portion has a box-shaped structure constituted by a front spar, a rear spar, upper and lower skins, stringers, ribs, etc.

Some methods for forming a structure having a closed space internally like the box-shaped structure have been proposed. The methods include (1) a method in which plate-like bodies 510 prepared by used of a metal material or a composite material are used to form a rectangular parallelepiped box-like body 520 having an open portion 521 as shown in FIG. 28, an upper portion plate-like body 530 is disposed on the upper portion of a flange 522 provided in the open portion 521, and the flange 522 and the upper portion plate-like body 530 are coupled with each other by use of mechanical coupling units (rivets) 540 as shown in FIG. 29; and (2) a method in which two rectangular parallelepiped box-like bodies each having an open portion are formed by use of a plurality of combination mandrels in an RTM method (Resin-Transfer-Molding), and the open portions of the two box-like bodies are coupled by use of mechanically coupling units.

However, according to the method (1), as shown in FIGS. 28 and 29, complicated works were required. Such complicated works included the work of forming rivet holes in the flange 522 provided in the open portion 521 of the box-like body 520 and in the circumferential edge portion of the upper portion plate-like body 530, and the work of fastening rivets. In addition, when a large-sized structure such a sawing box portion of an aircraft was formed, a large number of rivets 540 were required to result in increase of the weight, contrary to the request of reduction in weight. Further, the cost to manufacture the rivets 540 was required separately.

On the other hand, according to the method (2), the open portions of the box-like bodies had to be coupled by rivets so that there arose problems similar to those in the method (1). That is, works were complicated, the weight of the structure increased, and the cost increased. In addition, metal mandrels matching the shape of the structure had to be used. Accordingly, a large number of metal mandrels different in shape had to be prepared. Further, in the heating step using the RTM method, the molded box-like bodies were contracted thermally. Accordingly, the work (demolding work) for extracting the metal mandrels from the insides of the box-like bodies was so difficult that the manufacturing cycle was delayed.

By the way, to meet the demands of lighter weight and higher strength in aircraft in the aerospace field, aircraft structures are often manufactured by use of fiber reinforced plastics in recent years. For example, a stiffened panel 610 to be incorporated in a wing of an aircraft as shown in FIG. 30 is manufactured by molding a skin 611 and stiffenerss 612 individually and then coupling them by fasteners or bonding them by a bonding adhesive. As the method for molding the skin 611, there is employed a method in which prepregs are laminated and hardened; or a method in which thermosetting resin is impregnated into reinforced fiber and hardened.

The following method is also employed. That is, a prepreg laminated to the skin 611, and stiffenerss 612 primarily hardened in advance are laminated through a bonding adhesive. Bagging films are inserted into spaces (hollow portions) surrounded by the stiffeners 612 and the prepreg for the skin 611 respectively. After then, the stiffeners 612 and the prepreg for the skin 611 are covered with a bagging film. The air is evacuated from the bagging film while the bagging film is pressed and heated from its outside so as to harden and mold the prepreg for the skin 611 and the stiffeners 612. Thus, the stiffened panel 610 is manufactured.

On the other hand, examples of the method for manufacturing a movable wing 620 such as an aileron, a flap or a tab by use of a fiber reinforced composite material may include: a method in which prepregs for a leading edge portion 621, a spar portion 622 and a skin portion 623 are laminated and hardened, then disposed in predetermined positions, and coupled by fasteners or bonded by a bonding adhesive; and a method in which fiber reinforced fabric materials for a leading edge portion 621, a spar portion 622 and a skin portion 623 are set in a molding jig, and thermosetting resin is introduced thereto from the outside, impregnated therein and hardened, as shown in FIGS. 31A and 31B.

Also when the movable wing 620 is manufactured, divisible mandrels made of metal or hard rubber are inserted into a front hollow portion 630 formed by a leading edge portion 621 and a spar portion 622, and a rear hollow portion 640 formed by the spar portion 622 and upper and lower skin portions 623 (see FIG. 31B). When the respective hollow portions 630 and 640 have complicated curved internal surfaces, bagging films are inserted into the respective hollow portions 630 and 640 so as to introduce compressed gas thereto. Thus, the shapes of the leading edge portion 621, the spar portion 622 and the upper and lower skin portions 623 are prevented from being deformed by the application of pressure at the time of resin hardening, while the thermosetting resin is prevented from flowing into the respective hollow portions 630 and 640.

However, when the stiffened panel 610 was manufactured, the shapes of the bagging films were not stable, so that it was difficult to dispose the bagging films accurately to match the internal shapes of the hollow portions. When the bagging films were not disposed accurately to match the internal shapes of the hollow portions, the pressure applied to the prepreg or the fiber reinforced fabric material might be uneven when the thermosetting resin was hardened. Thus, the product quality was deteriorated. Further, at the time of molding, the bagging films might be bored so that pressurization was impossible, or the bagging films might be broken to be left in the hollow portions when they were removed. Further, the bagging films had to be exchanged in every manufacturing process, so that the cost increased.

On the other hand, when the mandrels made of metal were used to manufacture the movable wing 620, the hollow portions had to be formed to have constant or one-directionally tapered shapes so that the metal mandrels could be extracted after the molding. Accordingly, the product shape was limited. In addition, when the shapes of the metal mandrels were disordered slightly in accuracy, it was difficult or impossible to extract the metal mandrels from the hollow portions. Therefore, extremely stringent processing accuracy was required so that the manufacturing cost for the metal mandrels increased. Further, the metal mandrels were so heavy that they were difficult to handle.

On the other hand, the mandrels made of hard rubber were light in weight and did not need stringent processing accuracy in comparison with the metal mandrels. However, the thermal expansivity of rubber was so high that excessive pressure might be applied to thin portions of the prepreg or the fiber reinforced fabric material by the expansion of the hard rubber mandrels in accordance with heating when the thermosetting resin was hardened. Thus, the product quality might be deteriorated.

By the way, aircraft or space structures are desired to be structurally high in strength and light in weight from the point of view of special characteristics of application of the aircraft or space structures. To this end, when wings, enpennages, a fuselage, and so on, of an aircraft are formed, a semimonocoque structure by which a load mainly is applied to a shell member is adopted. Wings of an aircraft can be taken as representative examples of such a semimonocoque structure. A wing of an aircraft is constituted by a leading edge portion, a wing box portion and a trailing edge portion. Of them, the wing box portion has a box-shaped structure constituted by a front spar, a rear spar, upper and lower skins, stringers, ribs, etc.

Some methods for forming a structure having a closed space internally like the box-shaped structure have been proposed. The methods include a method in which a box-like body having an open portion is prepared, a skin is disposed on the upper portion of a flange provided in the open portion, and the flange in the open portion and the skin are coupled with each other by use of a mechanical bonding unit (fastener); and a method in which two box-like bodies each having an open portion are molded by use of a plurality of combination mandrels, and the open portions of the two box-like bodies are coupled.

However, according to the method using a fastener, stress was concentrated in the coupling portion where the fastener was used. Thus, there was a problem in fatigue characteristics. In addition, the fastener was generally made of metal, resulting in increase in weight and cost of the structure. On the other hand, according to the method using mandrels, it was necessary to couple the open portions of the box-like bodies with each other through a fastener finally. Thus, there occurred similar problems such as stress concentration, increase in weight and cost of the structure as described above. In addition, efforts were required for the work (demolding work) to extract the mandrels from the insides of the box-like bodies.

To solve such problems, the following method has been proposed. That is, a box-like body is filled with a predetermined amount of beads made of silicon rubber being superior in thermal expansivity. A skin is disposed on a flange in an open portion of the box-like body through a bonding adhesive. The silicon rubber beads are heated together with the box-like body and the skin so that the silicon rubber beads are thermally expanded. As a result, pressing force is applied from the inside of the box-like body to the outside thereof. Thus, the box-like body is bonded with the skin.

However, according to the method using beads made of silicon rubber, the filling amount or the initial pressing rate of the silicon rubber beads as pressure media had to be established precisely in order to obtain proper bonding pressure.

Further, as a method for bonding a plurality of constituent parts in combination so as to form a box-like body, there has been a method using a pressure bag (see Japanese Patent Laid-Open No. 58-205730). In this method, a plurality of constituent parts for constituting a box-like body are combined, wholly covered with a packing material (pressure bag made of silicon rubber), and then pressurized so that the respective constituent parts are bonded. The method is applied to the case where a box-like body is pressure-molded out of an impregnated prepreg in an autoclave.

However, according to the bonding method using a pressure bag, a special jig was required because it was necessary to mold the pressure bag correspondingly to the inner surface shape of the box-like body to be formed. Thus, the cost increased and a space for storing and managing the special jig was required. In addition, when the box-like body to be formed had a complicated inner surface shape, the shape of the pressure bag also became complicated. Thus, not only was it difficult to mold the pressure bag, but there also occurred a problem in durability thereof. Further, the work to bring the pressure bag into tight contact with the inner surface of a product was complicated.

SUMMARY OF THE INVENTION

A first object of the present invention is to provide a bonding method using spherical bodies made of silicon rubber, in which the cost effectiveness is extremely excellent, and uniform pressure can be applied to adherends.

A second object of the present invention is to provide a method for manufacturing a structure with a closed space, in which a flexible mandrel deformable freely and demolded easily is used so that the labor for manufacturing and the manufacturing cost are reduced, and the manufacturing cycle is accelerated.

A third object of the present invention is to provide a method for manufacturing a composite material stiffened panel, in which the labor and cost for manufacturing can be reduced on a large scale while a high-quality composite material product can be obtained.

A fourth object of the present invention is to provide a method for manufacturing a structure with a closed space so that the working efficiency is improved on a large scale and the bonding state is stabilized to thereby achieve higher quality of a product in.

In order to solve the problems, according to a first aspect of the present invention, there is provided a method for manufacturing a structural body comprising: a structural body formation step of forming the structural body by combining a plurality of constituent members through a bonding adhesive; a closed space formation step of disposing the structural body into a pressurizing or heating unit, forming a closed space with at least one of the structural body and the pressurizing or heating unit, and charging an elastic body into the closed space; a hardening step of fixing or hardening the bonding adhesive through the elastic body by the pressurizing or heating unit; and a discharge step of discharging the elastic body from the closed space.

In order to solve the problems, according to a second aspect of the present invention, there is provided the method for manufacturing a structural body according to the first aspect of the present invention, wherein the structural body formation step further comprises a lamination step of laminating the plurality of constituent members through the bonding adhesive, the closed space formation step further comprises a disposition step of disposing the structural body in a pressurizing portion of the pressurizing unit through spherical bodies made of silicon rubber as the elastic body, and the hardening step further comprises a pressurization step of compressively deforming the spherical bodies by the pressurizing unit to thereby apply pressure to the structural body.

According to the first and second aspects of the present invention, pressure is applied to the adherends through the spherical bodies made of silicon rubber. Accordingly, uniform pressure can be applied to the adherends without using a pressurized method using fluid, which method is employed in an autoclave or the like. Thus, the cost for constructing the equipment or the operation cost does not increase, so that the cost effectiveness is extremely excellent.

In addition, according to the first and second aspects of the present invention, pressure is applied to the adherends through the spherical bodies made of silicon rubber. Accordingly, uniform pressure can be applied all over the adherends. Therefore, there is no fear that the bonding adhesive is thinned locally due to the pressure applied to only a part of the adherends. As a result, a sufficient bonding effect can be obtained.

Further, according to the first and second aspects of the present invention, pressure is applied to the adherends through the spherical bodies made of silicon rubber. Accordingly, if the diameter, hardness, pressing rate, and so on, of the spherical bodies made of silicon rubber are varied suitably so as to measure a pressurizing value in advance, the magnitude of the pressure to be applied to the adherends can be established easily by the deformation rate of the spherical bodies made of silicon rubber.

Furthermore, according to the first and second aspects of the present invention, pressure is applied to the adherends through the spherical bodies made of silicon rubber. Accordingly, even if the bonded surfaces of the adherends have curved shapes, the spherical bodies made of silicon rubber are deformed to match the curved shapes while supporting the adherends, so that uniform pressure can be applied to the adherends. Thus, it is not necessary to manufacture jigs in accordance with the bonding curved surfaces of the adherends, and there is no fear that the cost increases.

According to a third aspect of the present invention, there is provided that the method for manufacturing a structural body according to the second aspect of the present invention, wherein the hardening step further comprises a heating step of heating the constituent members laminated to one another through the bonding adhesive while heating and expanding the spherical bodies to thereby apply pressure to the structure, and a value of the pressure applied in the heating step is set by a rate of compressive deformation of the spherical bodies at room temperature.

According to the third aspect of the present invention, in addition to the effect and advantage of the second aspect of the present invention, the spherical bodies made of silicon rubber have thermal expansivity higher than that of a material forming a normal pressure jig, and heat resistance even at a temperature higher than the hardening temperature of a thermosetting bonding adhesive. Thus, there is no fear that the thermal expansivity is lowered. Accordingly, pressure can be applied to the adherends surely. In addition, the pressurizing value in the heating step can be examined by a model test if the material and size of a heating jig used in the heating step are destined. Thus, the pressurizing value can be established by the compressive deformation rate of the spherical bodies at room temperature. As a result, the pressurizing value can be established easily.

According to a fourth aspect of the present invention, there is provided that the method for manufacturing a structural body according to the third aspect of the present invention, wherein the rate of compressive deformation of the spherical bodies is measured by pressuring the spherical bodies charged into a vessel to a desired height, the vessel having a constant sectional area.

According to the fourth aspect of the present invention, in addition to the effect and advantage of the third aspect of the present invention, the compressive deformation rate (for establishing the pressurizing value) is measured in the state where the spherical bodies made of silicon rubber are charged into a vessel having a constant sectional area to a desired height and compressed. Accordingly, the pressurizing value can be established extremely easily.

In order to solve the problems, according to the fifth aspect of the present invention, there is provided that the method for manufacturing a structural body according to the first aspect of the present invention, wherein the structural body formation step includes a thermosetting bonding adhesive as the bonding adhesive, the closed space formation step temporarily forms a structural body which has the closed space and comprises a flexible mandrel having silicon rubber beads as the elastic body, the hardening step further comprises a heating step of fixing the structural body with a predetermined jig, heating the structural body to thereby expand the flexible mandrel to apply pressing force from inside to outside the closed space while hardening the bonding adhesive, and the discharge step discharges the flexible mandrel from the closed space.

According to the fifth aspect of the present invention, a structure with a closed space can be manufactured integrally by bonding by use of a flexible mandrel without going through a rivet coupling step. Accordingly, complicated works such as the work of forming rivet holes, the work of fastening rivets, and so on, can be omitted, so that the labor for manufacturing can be reduced on a large scale.

In addition, according to the fifth aspect of the present invention, a structure with a closed space can be manufactured not by use of any metal mandrel but by use of a flexible mandrel. Accordingly, it is not necessary to prepare a large number of kinds of metal mandrels matching the shape of the structure to be manufactured. Thus, the manufacturing cost can be reduced on a large scale.

According to a sixth aspect of the present invention, there is provided the method for manufacturing a structural body according to the fifth aspect of the present invention, wherein the constituent members include a plate-like body, and a box-like body having an open-portion, a bonding margin extending inward the open portion, and a closable access hole, and the method further comprises: a box-like body formation step of forming the box-like body including a plurality of plate-like members cooperatingly forming the bonding margin, and charging flexible mandrel into the box-like body, the box-like body formation step being carried out previously to the closed space formation step.

According to the sixth aspect of the present invention, in addition to the effect and advantage of the fifth aspect of the present invention, a structure with a closed space can be manufactured not by use of any metal mandrel but by use of a flexible mandrel, and this flexible mandrel can be discharged from the access hole easily after the termination of the manufacture. Accordingly, the demolding work which was difficult in the related art becomes extremely easy. Thus, the manufacturing cycle can be accelerated.

In addition, according to the sixth aspect of the present invention, in addition to the effect and advantage of the fifth aspect of the present invention, a structure with a closed space can be manufactured not by use of any metal mandrel but by use of a flexible mandrel, and the flexible mandrel used in this manufacturing process can be discharged from the access hole after the termination of the manufacture and reused in the next manufacturing process. Accordingly, the manufacturing cost can be reduced on a large scale.

According to a seventh aspect of the present invention, there is provided that the method for manufacturing a structural body according to the fifth or sixth aspect of the present invention, wherein the flexible mandrel is constituted by only silicon rubber beads.

According to an eighth aspect of the present invention, there is provided that the method for manufacturing a structural body according to the fifth or sixth aspect of the present invention, wherein the flexible mandrel is constituted by a mixture of silicon rubber beads and glass beads.

According to the seventh and eighth aspects of the present invention, in addition to the effect and advantage of the fifth and sixth aspects of the present invention, pressing force based on the expansion of the flexible mandrel in the heating step can be controlled desirably by appropriately changing the filling rate, diameter and hardness of the silicon rubber beads or by appropriately changing the mixing ratio between the silicon rubber beads and the glass beads. Accordingly, optimal pressing force can be applied to the structure in accordance with the material or size of constituent members, the kind of the bonding adhesive, or the like, so that a higher quality structure can be manufactured.

In order to solve the problems, according to a ninth aspect of the present invention, there is provided that the method for manufacturing a structural body according to the first aspect of the present invention, wherein the structural body formation step further comprises a skin material lamination step of laminating a skin material on a lower mold jig, the closed space formation step further comprises a flexible mandrel disposition step of disposing a flexible mandrel in a predetermined position on the skin material, the flexible mandrel being constituted by a bag body which has stretchability and heat resistance and is filled with silicon rubber beads or a mixture of silicon rubber beads and glass beads as the elastic body, the hardening step further comprises a heating step of heating the skin material and the stiffener material while evacuating the space, the discharge step further comprises a beads discharge step of discharging the beads from the flexible mandrel, and he method further comprises: a stiffener material disposition step of disposing a stiffener material on the skin material so as to cover the flexible mandrel; an upper mold jig disposition step of disposing an upper mold jig on the skin material and the stiffener material; and an evacuation step of evacuating the air of a space surrounded by the upper mold jig and the lower mold jig; the stiffener material disposition step, the upper mold jig disposition step and the evacuation step being carried out between the closed space formation step and the hardening step.

According to the ninth aspect of the present invention, a flexible mandrel is used for supporting the stiffener material, in place of a bagging film used in the related art. This flexible mandrel can be deformed freely in accordance with the internal shape of the stiffener in advance. Thus, uniform pressure can be applied to the skin material and the stiffener material. As a result, a composite material product with extremely high quality can be obtained.

In addition, according to the ninth aspect of the present invention, the stiffener material is supported by a flexible mandrel which is used in place of a bagging film used in the related art, and this flexible mandrel can be extracted after molding, and used repeatedly plural times. Accordingly, the manufacturing cost can be reduced on a large scale.

Further, according to the ninth aspect of the present invention, a flexible mandrel is used for supporting the stiffener material, in place of a metal mandrel used in the related art. This flexible mandrel can be deformed freely so that the flexible mandrel can be extracted from between the skin and the stiffener easily after molding, regardless of the internal shape of the stiffener. Accordingly, composite material stiffened panels having various shapes can be manufactured. In addition, the flexible mandrel is not required to have processing accuracy as stringent as that of the metal mandrel. Thus, the cost for manufacturing the mandrel can be suppressed. In addition, the flexible mandrel is lighter in weight than the metal mandrel; so that the flexible mandrel is extremely easy to handle.

Furthermore, according to the ninth aspect of the present invention, a flexible mandrel is used for supporting the stiffener material, in place of a hard rubber mandrel used in the related art. The magnitude of pressure applied to the skin material and the stiffener material can be controlled by adjusting the mixing ratio or the filling rate of silicon rubber beads or glass beads forming the flexible mandrel. Accordingly, a composite material product with extremely high quality can be obtained.

According to a tenth aspect of the present invention, there is provided that the method for manufacturing a structural body according to the ninth aspect of the present invention, wherein the skin material includes a thermosetting resin film, and a fiber reinforced fabric material which is free from being impregnated with resin and which is disposed on the thermosetting resin film, the stiffener material is a fiber reinforced fabric material which is free from being impregnated with resin, and a suction port for evacuation in the evacuation step and the heating step is formed in a portion of the upper mold jig above the stiffener material.

According to the tenth aspect of the present invention, in addition to the effect and advantage of the ninth aspect of the present invention, a thermosetting resin film is disposed, heated and melted, so that the thermosetting resin is impregnated into the fiber reinforced fabric material, and hardened. Since the thermosetting resin film can be prepared extremely easily, the labor and cost for manufacturing can be further reduced.

According to an eleventh aspect of the present invention, there is provided that the method for manufacturing a structural body according to the ninth aspect of the present invention, wherein the skin material and the stiffener material are fiber reinforced fabric materials which are free from being impregnated with resin, and the method further comprises: a resin introduction step of introducing thermosetting resin into the space surrounded by the lower mold jig and the upper mold jig so as to impregnate the thermosetting resin into the skin material and the stiffener material, the resin introduction step being carried out between the evacuation step and the heating step.

According to the eleventh aspect of the present invention, in addition to the effect and advantage of the ninth aspect of the present invention, thermosetting resin is introduced only by vacuum pressure so as to be impregnated into the fiber reinforced fabric material as the skin material and the stiffener material, and the impregnated thermosetting resin is hardened. Since the step of applying pressure to thereby impregnate resin is omitted, the labor and cost for manufacturing can be further reduced.

According to a twelfth aspect of the present invention, there is provided that the method for manufacturing a structural body according to the eleventh aspect of the present invention, wherein the skin material and the stiffener material are prepregs including a fiber reinforced impregnated with thermosetting resin.

According to a thirteenth aspect of the present invention, there is provided that the method for manufacturing a structural body according to the ninth aspect of the present invention, wherein the skin material is a prepreg including a fiber reinforced impregnated with thermosetting resin, and the stiffener material is a fiber reinforced resin component in which thermosetting resin has been primarily hardened.

According to the twelfth and thirteenth aspects of the present invention, the effect and advantage of the ninths aspect of the present invention can be attained sufficiently while a so-called prepreg lamination method or a so-called co-bonding method which has been heretofore employed is employed. Accordingly, an existing prepreg manufacturing apparatus or an existing autoclave can be utilized effectively so that a higher quality composite material product can be manufactured.

In order to solve the problems, according to a fourteenth aspect of the present invention, there is provided that the method for manufacturing a structural body according to the first aspect of the present invention, wherein the structural body formation step further comprises: a box-like body production step of producing a box-like body and a skin, the box-like body being formed to have an open portion with a flange in one side surface thereof and a access hole in another side surface thereof to be smaller than the open portion; the skin being bonded with the flange so as to close the open portion; a pressure bag preparation step of preparing a pressure bag having an attachment portion and a bag body portion being superior in stretchability; and a pressure bag disposing step of disposing the bag body portion of the pressure bag into the box-like body, and fixing the attachment portion of the pressure bag into the access hole in a state where the attachment portion of the pressure bag is kept opening to an outside of the box-like body, the closed space formation step further comprises an elastic body charging step of charging the elastic body into the box-like body; and temporarily forming a structural body with a closed space by disposing the skin on the flange of the box-like body filled with the elastic body through a bonding adhesive, the discharge step further comprises a discharge step of discharging the pressure bag and the elastic body from the access hole, and the method further comprises: covering step of covering the structural body with the closed space with a vacuum bag except the attachment portion of the pressure bag which is kept opening to the outside of the box-like body; and an evacuation step of evacuating the air of a portion surrounded by the structural body with the closed space and the vacuum bag, and the air of the closed space, the covering step and the evacuation step being carried out between the charging step and the hardening step.

According to the fourteenth aspect of the present invention, a structure with a closed space is temporarily formed by preparing a pressure bag having an attachment portion and a bag body portion being superior in stretchability; disposing the bag body portion of the pressure bag into the box-like body, while the attachment portion of the pressure bag is fixed into the access hole in the state where the attachment portion is kept opening to the outside of the box-like body; charging an elastic body into the box-like body; and disposing the skin on the flange of the box-like body filled with the elastic body through a bonding adhesive. The structure with the closed space is then covered with a vacuum bag, except the attachment portion of the pressure bag which is disposed on the access hole and which is kept opening to the outside of the box-like body. The air is evacuated from a portion surrounded by the structure with the closed space and the vacuum bag, and from the closed space. Thus, pressing force using the atmospheric pressure can be applied to the interior of the structure with the closed space through the pressure bag and the elastic body, while pressing force using the atmospheric pressure can be applied to the exterior of the structure with the closed space through the vacuum bag.

Accordingly, the pressing force applied to the interior of the structure with the closed space can be extremely easily balanced with the pressing force applied to the exterior of the structure with the closed space. Thus, uniform pressure can be applied to the opposite surfaces of a bonding portion (that is, the flange of the box-like body, and a circumferential edge portion of the skin disposed on the flange through a bonding adhesive) extremely easily.

According to the manufacturing method according to the present invention, establishment of the filling amount or the initial pressing rate of pressure media may be omitted so that the time and labor required for the bonding work can be reduced. As a result, the working efficiency can be improved on a large scale. In addition, pressing forces (pressing forces using the atmospheric pressure) acting respectively on the interior and exterior of the skin and the box-like body are always balanced with each other while the skin and the box-like body are constituent parts of the structure with the closed space. Accordingly, there is no fear that these constituent parts are bent so that higher product quality can be achieved.

In addition, according to the fourteenth aspect of the present invention, when the pressing force using the atmospheric pressure is applied to the interior of the structure with the closed space through the pressure bag and the elastic body, bonding pressure can be applied uniformly all over the inner surface of the box-like body because the elastic body is deformed correspondingly to the inner surface shape of the box-like body. Accordingly, the bonding pressure can be applied also to the bonding portion uniformly so that a stable bonding effect can be obtained. Also from this point of view, higher product quality can be achieved.

Further, according to the related-art method using only a pressure bag as a pressure medium, a special jig is required because it is necessary to mold the pressure bag correspondingly the inner surface shape of a box-like body. By contrast, according to the fourteenth aspect of the present invention, such a special jig is not required so that there is no fear that the cost for manufacturing increases. In addition, even when the box-like body has a complicated inner surface shape, the elastic body is deformed correspondingly to the inner surface shape of the box-like body. Thus, it is not necessary to mold a pressure bag having a complicated shape, and the labor to bring the pressure bag into tight contact with the inner surface shape can be saved.

In the method for manufacturing a structure according to a fifteenth aspect of the present invention, there is provided that the method for manufacturing a structural body according to the fourteenth aspect of the present invention, wherein the elastic body has silicon rubber beads as its main constituent components.

According to the fifteenth aspect of the present invention, silicon rubber beads being superior in flexibility and thermal expansivity are used as the main constituent components of the elastic body. Accordingly, for example, when small-diameter silicon rubber beads are heated in a hardening step so as to be fluidized and deformed, the elastic body can enter narrow gaps so that bonding pressure can be applied to fine portions of the box-like body. As a result, further higher product quality can be achieved.

In addition, according to the fifteenth aspect of the present invention, since silicon rubber beads being superior in heat resistance are used as the main constituent components of the elastic body, there is no fear that the elastic body is deteriorated, for example, even if the elastic body is heated in the hardening step. Accordingly, even when a bonding adhesive to be hardened at a comparatively high temperature is used, the elastic body can withstand the curing temperature sufficiently. As a result, the bonding adhesive can be hardened surely so that further higher product quality can be achieved.

According to a sixteenth aspect of the present invention, there is provided a method for manufacturing a structural body comprising: laminating step of laminating a plurality of constituent members with a bonding adhesive; providing step of providing spherical bodies made of silicon rubber on an opposite surface against the surface applied to the bonding adhesive of at least one of the constituent members; and hardening step of hardening the bonding adhesive with pressurizing the surface applied to the bonding adhesive by the spherical bodies so as to prevent the constituent members from bending deformed.

According to a seventeenth aspect of the present invention, there is provided a method according to the sixteenth aspect, wherein the bonding adhesive includes a thermosetting bonding adhesive, and is hardened by heating the constituent members.

DESCRIPTION OF THE PREFERRED EMBODIMENTS

Embodiments of the present invention will be described below in detail with reference to the drawings.

First Embodiment

In this embodiment, with reference to FIG. 1, description will be made on a method for bonding two flat plates 30 as adherends by use of spherical bodies 10 made of silicon rubber and C-clamps 20.

First, surface treatment is carried out on bonded surfaces of the two flat plates 30. This surface treatment is carried out in order to eliminate inorganic matter such as rust or organic matter such as finger marks adhering to the respective bonded surfaces and impeding bonding. The surface treatment may be carried out in a mechanical method in which the respective bonded surfaces are polished and then degreased with a solvent; or in a chemical method in which chemicals are applied onto the bonded surfaces after degreasing with a solvent.

Next, a bonding adhesive 40 is applied onto the respective bonded surfaces of the two flat plates 30, and the bonded surfaces are laminated to each other (lamination step). In this embodiment, a room-temperature setting bonding adhesive such as an epoxy-based two-component bonding adhesive, a polyurethane-based two-component bonding adhesive or a denatured-acrylic-resin-based two-component bonding adhesive is used as the bonding adhesive 40.

Figure 1:
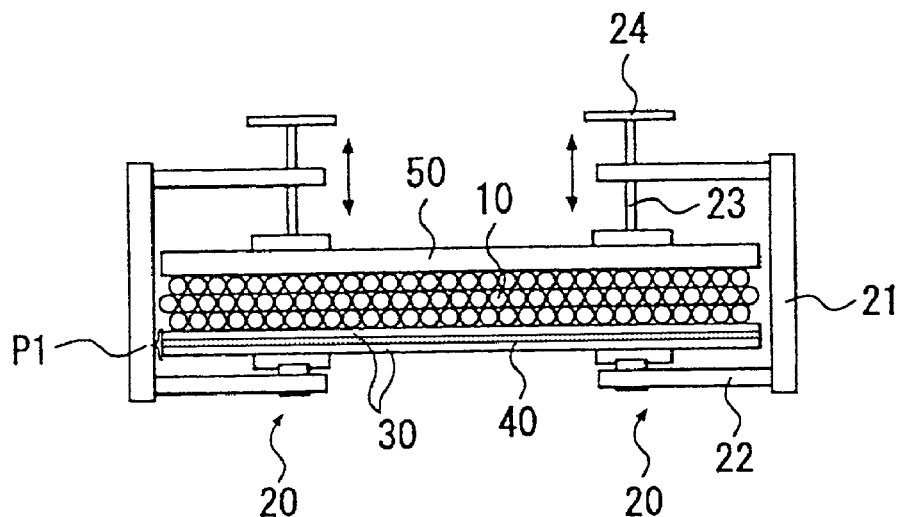
FIG. 1 is a side view for explaining a bonding method according to a first embodiment of the present invention, showing the state where pressure is applied to a laminate by use of C-clamps and silicon balls.

Next, a laminate of the two flat plates 30 stuck to each other (hereinafter referred to as "laminate P1") is disposed in pressurizing portions of the C-clamps 20 as shown in FIG. 1 (disposition step). The pressurizing portion of each C-clamp 20 is constituted by a clamp arm 21, a fixed portion 22 disposed on the lower side of this clamp arm 21, and a movable portion 23 disposed on the upper side of the clamp arm 21. The movable portion 23 is made movable up and down by a screw-type handle 24. When the movable portion 23 is moved downward (toward the fixed portion 22) by the screw-type handle 24 in the state where the laminate P1 has been disposed between the fixed portion 22 and the movable portion 23, pressure is applied to the laminate P1.

When the laminate P1 is disposed in the pressurizing portions of the C-clamps 20, a plurality of spherical bodies 10 made of silicon rubber (hereinafter referred to as "silicon balls") and a pressure plate 50 are disposed between the laminate P1 and the movable portions 23 of the C-clamps 20 as shown in FIG. 1. The silicon balls 10 are substantially spherical pressure transmitting media by which the pressure applied by the movable portions 23 of the C-clamps 20 is transmitted toward the laminate P1. In this embodiment, the silicon balls 10 are 4 mm in diameter and Hs (durometer hardness) 50 in hardness.

A flat plate reinforced to be thick enough so as not to be deformed easily is used as the pressure plate 50. This pressure plate 50 is disposed on the upper side of the silicon balls 10 as shown in FIG. 1 so as to fulfill a function of transmitting pressure from the movable portions 23 of the C-clamps 20 to the silicon balls 10 uniformly. Incidentally, through not shown, side walls are provided around the laminate P1 so as to prevent the silicon balls 10 disposed on the laminate P1 from jumping out to the outside.

Next, the movable portions 23 of the C-clamps 20 are moved toward the fixed portions 22 by the screw-type handles 24 so as to apply pressure to the laminate P1 through the pressure plate 50 and the silicon balls 10 (pressurization step). At this time, the magnitude of the pressure (pressurizing value) applied to the laminate P1 by the silicon balls 10 can be established in accordance with the rate (pressing rate) with which the silicon balls 10 are pressurized to be compressed, as will be described later.

Here, an experimental result showing the relationship between the "pressing rate" of the silicon balls 10 and the "pressurizing value" will be described with reference to FIGS. 5A and 5B, and Table-1.

TABLE 1

| silicon ball properties | silicon ball diameter: 4 mmφ<br>silicon ball hardness: Hs 50<br>silicon ball thermal expansivity: 3.75 × 10$^{-4}$ mm/mm/° C.<br>silicon ball heat resistance: −55 to 250° C. | | | | |
|---|---|---|---|---|---|
| A: single-layer flat stack test | | | | | |
| pressing rate *1 | 0% | 10% OFF | 15% OFF | 20% OFF | — |
| filling rate *1 | 53.6% | 59.6% | 63.1% | 67% | — |
| first pressurizing value (kPa) *1 | 0 | 22 | 49 | 87 | — |
| second pressurizing value (kPa) *2 | 22 | 55 | 108 | 196 | — |
| B: free stack test | | | | | |
| pressing rate *1 | 0% | 10.4% OFF | 13.1% OFF | 15.8% OFF | 20% OFF |
| filling rate *1 | 55.9% | 63% | 65% | 67% | 70% |
| first pressurizing value (kPa) *1 | 0 | 34 | 51 | 71 | 101 |
| second pressurizing value (kPa) *2 | 12 | 90 | 124 | 159 | 212 |

*1 value at room temperature
*2 value at 180° C. heating

<A: Single-Layer Flat Stack Test>

Figure 5A:
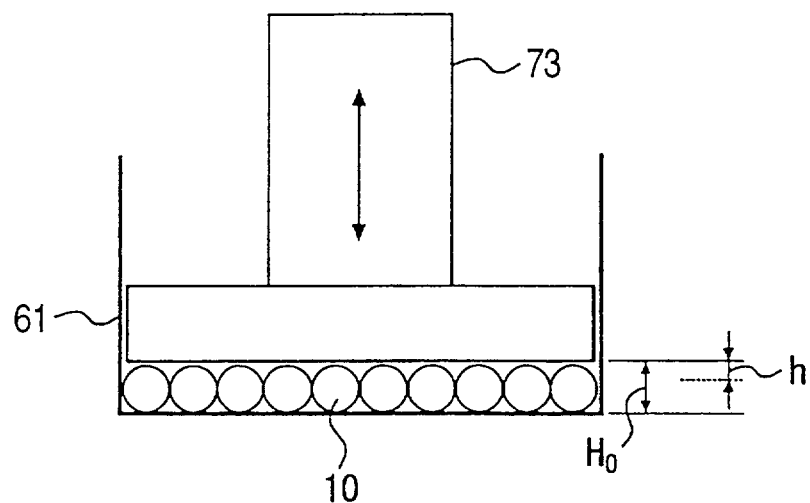
FIGS. 5A and 5B are views for explaining tests for examining the relationship between the pressing rate of the silicon balls used in the bonding methods according to the embodiments, and a pressurizing value, FIG. 5A being a conceptual view of a single-layer flat stack test, FIG. 5B being a conceptual view of a free stack test.

In this test, first, as shown in FIG. 5A, the silicon balls 10 were spread in a single layer all over the bottom wall of a vessel 61 of a universal testing machine. A piston 73 was inserted into this vessel 61 and disposed on the upper side of the silicon balls 10. A filling rate, a first pressurizing value and a second pressurizing value were measured in the state where downward pressure was applied to the silicon balls 10 by this piston 73 so as to compress the height of the silicon balls 10 (single-layer flat stack test).

Figure 5B:
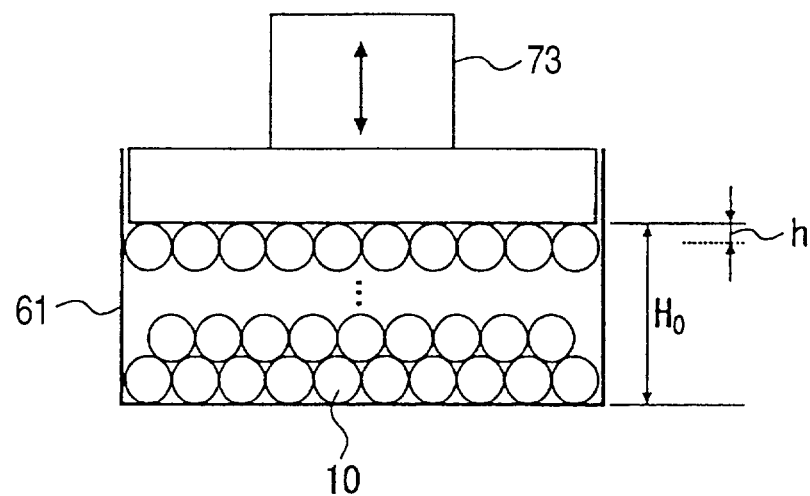

Incidentally, in this test, as shown in FIGS. 5A and 5B, the rate "(h/H$_0$)×100" of a compressed (or crushed) height h to an initial height H$_0$ of the silicon balls 10 is referred to as "pressing rate (%)". On the other hand, the "filling rate" in this test means a rate of the volume of the silicon balls 10 to the volume of the space surrounded by the vessel 61 and the lower surface of the piston 73.

In addition, in this test, the "first pressurizing value" means the magnitude of pressure applied to the lower surface of the piston 73 by the silicon balls 10 at the time of absence of heating (at the time of room temperature), while the "second pressurizing value" means the magnitude of pressure applied to the lower surface of the piston 73 by the silicon balls 10 when the silicon balls 10 are heated at 180° C. so as to be expanded. This second pressurizing value is used in second and fourth embodiments which will be described later.

First, the silicon balls 10 kept their original shapes in the state where no downward pressure was applied thereto by the piston 73 (in the state of the pressing rate 0%). The filling rate of the silicon balls 10 in this state was 53.6% as shown in Table-1, and the first pressurizing value in this state was 0 kPa (see Table-1).

Next, downward pressure was applied to the silicon balls 10 by the piston 73 so as to bring the silicon balls 10 from the state of the pressing rate 0% into the state of the pressing rate 10%. The filling rate in this case was increased to 59.6% as shown in Table-1, and the first pressurizing value in this state was 22 kPa (see Table-1). Subsequently, in the same procedure, the filling rates and the first pressurizing values in the cases of the pressing rates 15% and 20% were obtained respectively (see Table-1). After that, the silicon balls 10 were heated at 180° C., and the second pressurizing values in the states of the pressing rates 0%, 10%, 15% and 20% were obtained respectively (see Table-1).

<B: Free Stack Test>

Subsequently, as shown in FIG. 5B, the silicon balls 10 were thrown into the vessel 61 of the universal testing machine, so that the silicon balls 10 were spread freely to reach predetermined height (initial height $H_0=24$ (mm)) from the bottom wall of the vessel 61 while vibration and adjustment was given to the silicon balls 10. The piston 73 was inserted into this vessel 61 and disposed on the upper side of the silicon balls 10. Downward pressure was applied to the silicon balls 10 by this piston 73. Thus, the filling rates, the first pressurizing values and the second pressurizing values in the cases where the pressing rate was changed variously were measured. The experimental result is shown in Table-1 (free stack test). The definitions of terms and the procedure of measurement are similar to those in the "A: Single-Layer Flat Stack Test", and their description is omitted.

By use of the relationship between the "pressing rate" and the "first pressurizing value" in the experimental results, the pressurizing value can be established. For example, when the pressurizing value is to be set to 34 kPa by use of the experimental result in the "B: Free Stack Test", the pressing rate may be set to 10.4% (see Table-1). When the pressurizing value is to be set to 98 kPa likewise, the pressing rate may be set to about 20% (see Table-1). In addition, when the correlation between the "pressing rate" and the "first pressurizing value" is determined in an approximation function by a complementation method or the like using the numerical values of the experimental result, the pressing rate for obtaining a required pressurizing value can be obtained approximately by use of this approximation function.

Incidentally, when the bonding adhesive is an epoxy-based bonding adhesive or a rubber-based bonding adhesive, application of the pressure not lower than contact pressure (6.9 kPa to 13.7 kPa) has been considered as a pressing condition. However, since bubbles are usually mixed into the bonding adhesive layer when the adherends are laminated to each other, it is preferable that pressure not lower than pressure (34 kPa) five times as high as the contact pressure is applied to eliminate such bubbles.

Next, while the pressurization step was carried out, the bonding adhesive 40 sandwiched between the two flat plates 30 was hardened at room temperature (hardening step). The time required for this hardening depends on the kind of the bonding adhesive 40. The bonding of the two flat plates 30 with each other was completed in the procedure.

According to the bonding method relating to this embodiment, pressure is applied, through the silicon balls 10, to the laminate P1 of two flat plates 30 laminated to each other. Accordingly, uniform pressure can be applied to the laminate P1 without using a pressurizing method using gas as typified by an autoclave. Therefore, there is no fear that the cost for constructing the equipment or the operation cost increases. In addition, the silicon balls 10 can be recovered and reused. Accordingly, also from this point of view, the cost effectiveness is extremely excellent.

In addition, according to the bonding method relating to this embodiment, pressure is applied to the laminate P1 through the silicon balls 10. Accordingly, uniform pressure can be applied all over the surface of the laminate P1. Therefore, there is no fear that the bonding adhesive in the pressurized portions is thinned locally by the movable portions 23 of the C-clamps 20 as in the related art. As a result, a sufficient bonding effect can be obtained. In addition, since pressure is applied to the laminate PI through the silicon balls 10, sufficient pressure can be applied to the laminate PI even when thermal expansion occurs in the clamp arms 21 of the C-clamps 20.

Further, according to the bonding method relating to this embodiment, the pressurizing value of the pressure to be applied to the laminate P1 can be established easily by use of the relationship between the "pressing rate" and the "first pressurizing value" based on a given experimental result.

Second Embodiment

Figure 2:
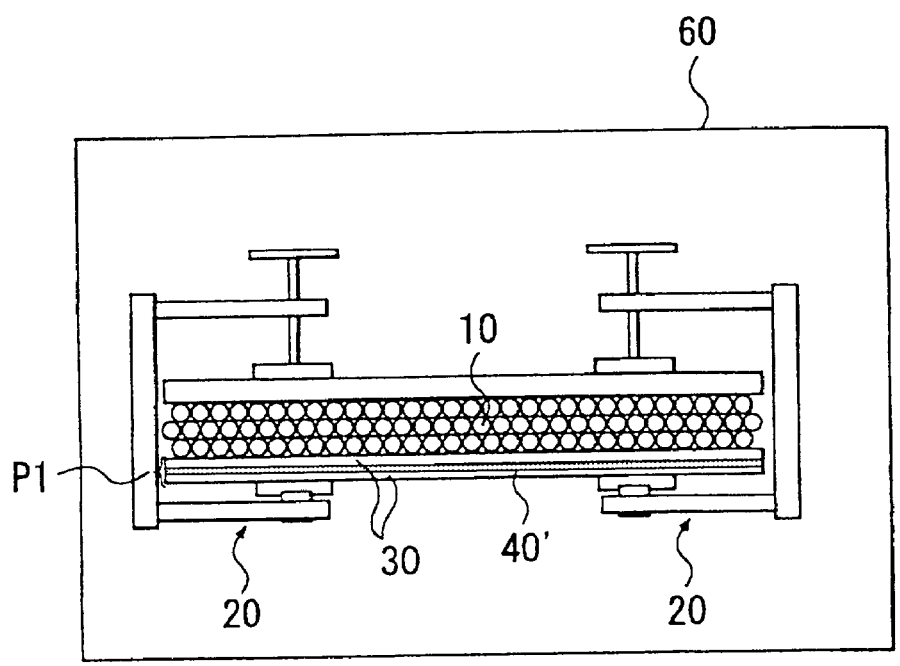
FIG. 2 is a side view for explaining a bonding method according to a second embodiment of the present invention, showing the state where a laminate is heated by a heating tank so as to be further pressurized.

Next, description will be made on the second embodiment with reference to FIG. 2. This embodiment provides a method in which two flat plates 30 as adherends are bonded with each other by use of silicon balls 10 and C-clamps 20 in the same manner as in the first embodiment, and a bonding adhesive is hardened by heating.

In this embodiment, movable portions 23 of the C-clamps 20 each of made of an iron alloy are moved toward fixed portions 22 by screw-type handles 24 so as to apply pressure to a laminate P1 through a pressure plate 50 and the silicon balls 10. After that, the C-clamps 20, the pressure plate 50, the silicon balls 10 and the laminate P1 are heated at 180° C. by a heating tank 60 (see FIG. 2).

The silicon balls 10 have, in themselves, heat resistance excellent enough to withstand temperature in a range of from −55° C. to 250° C. (see Table-1), and a property to expand in accordance with heating. Accordingly, the laminate P1 has further pressurized by the silicon balls 10 heated and expanded by the heating tank 60 (second pressurization step). Incidentally, the thermal expansivity of the silicon balls 10 used in this embodiment was set to $3.75 \times 10^{-4}$ (mm/mm/° C.) as shown in Table-1.

Here, as described previously, the "second pressurizing value" in each "pressing rate" is also measured in the "A: Single-Layer Flat Stack Test" and the "B: Free Stack Test" (see Table-1). Accordingly, the pressurizing value can be established by use of the relationship between the "pressing rate" and the "second pressurizing value".

For example, by use of the experimental result of the "B: Free Stack Test", when the pressurizing value is to be set to 124 kPa, the pressing rate at room temperature may be set to 13.1% (see Table-1). When the pressurizing value is to be set to 212 kPa, the pressing rate at room temperature may be set to about 20% (see Table-1). In addition, when the correlation between the "pressing rate" and the "second pressurizing value" is determined in an approximation function by a complementation method or the like using the numerical values of the experimental result, the pressing rate for obtaining a required pressurizing value can be obtained approximately by use of this approximation function.

In addition, in this embodiment, a thermosetting bonding adhesive 40' is used. By heating the laminate P by the heating tank 60, the thermosetting bonding adhesive 40' can be hardened. That is, the second pressurization step and the hardening step are carried out concurrently. Examples of the thermosetting bonding adhesive 40' include a (one-component) epoxy-based bonding adhesive, a urea-resin-based bonding adhesive, a melamine-resin-based bonding adhesive, and a phenolic-resin-based bonding adhesive.

According to the bonding method relating to this embodiment, by heating the silicon balls 10 to thereby expand the silicon balls 10, pressure can be applied to the laminate P1 surely. In addition, since the bonding adhesive 40' is of a thermosetting type, the hardening of this bonding adhesive 40' and the pressurization based on the thermal expansion of the silicon balls 10 can be carried out concurrently. Thus, the bonding method according to this embodiment is extremely efficiently. In addition, the pressurizing value of pressure applied to the laminate P1 can be established easily by use of the relationship between the "pressing rate" and the "second pressurizing value" based on a given experimental result.

Third Embodiment

Figure 3:
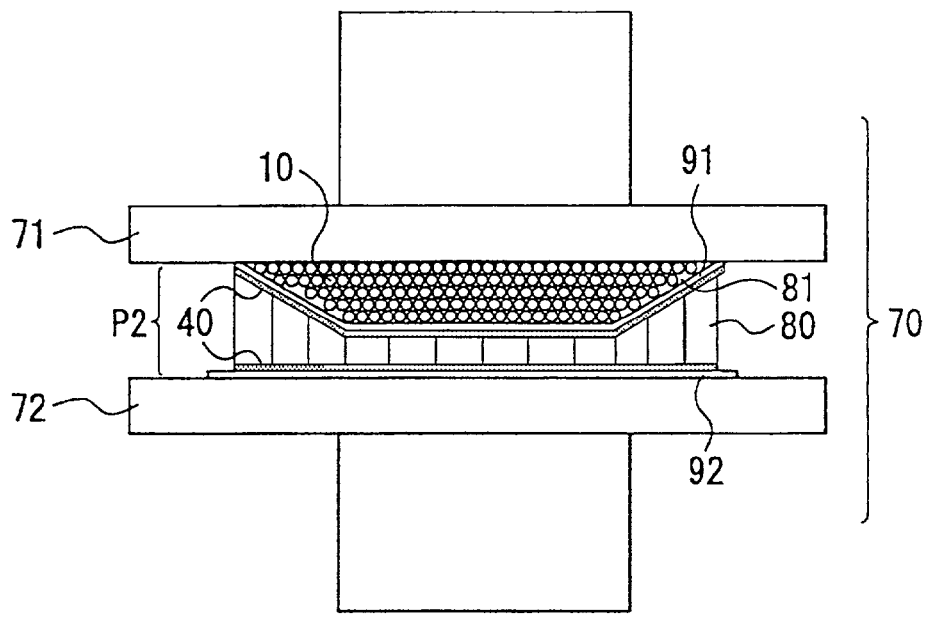
FIG. 3 is a side view for explaining a bonding method according to a third embodiment of the present invention, showing the state where pressure is applied to a laminate by use of a pressing machine and silicon balls.

In this embodiment, with reference to FIG. 3, description will be made on a method in which skins 91 and 92 are bonded respectively with the upper and lower surfaces of a honeycomb core 80 so as to form a honeycomb sandwich panel by use of silicon balls 10 and a pressing machine 70. A recess portion 81 is provided on the upper surface side of the honeycomb core 80 as shown in FIG. 3. The upper skin 91 to be bonded with the upper surface of the honeycomb core 80 is molded into the same shape as the upper surface shape having the recess portion 81. On the other hand, the lower skin 92 like a flat plate is bonded with the lower surface of the honeycomb core 80.

First, surface treatment is carried out on the respective bonded surfaces of the honeycomb core 80, the upper skin 91 and the lower skin 92. The surface treatment can be carried out in a manner similar to that in the first embodiment. Next, a bonding adhesive 40 is applied onto the respective bonded surfaces, and the upper skin 91 and the lower skin 92 are laminated onto the upper and lower surfaces of the honeycomb core 80 respectively (lamination step). In this embodiment, a room-temperature setting bonding adhesive is used as the bonding adhesive 40 in the same manner as that in the first embodiment.

Next, a laminate of the upper and lower skins 91 and 92 stuck onto the upper and lower surfaces of the honeycomb core 80 (hereinafter referred to as "laminate P2") is disposed in a pressurizing portion of the pressing machine 70 as shown in FIG. 3 (disposition step). The pressurizing portion of the pressing machine 70 is constituted by an upper pressure plate 71 which is movable up and down, and a lower pressure plate 72 which is fixed. When the upper pressure plate 71 is moved toward the lower pressure plate 72 in the state where the laminate P2 has been disposed between the upper pressure plate 71 and the lower pressure plate 72, pressure is applied to the laminate P2.

Since the recess portion 81 is provided on the upper surface side of the honeycomb core 80, a closed space is formed between the upper surface of the laminate P2 and the upper pressure plate 71 of the pressing machine 70. The silicon balls 10 used in the first embodiment are charged into this closed space (see FIG. 3).

Next, the upper pressure plate 71 of the pressing machine 70 is moved toward the lower pressure plate 72 so as to apply pressure to the laminate P2 through the silicon balls 10 (pressurization step). At this time, the magnitude (first pressurizing value) of pressure applied to the laminate P2 by the silicon balls 10 can be established in accordance with the rate (pressing rate) with which the silicon balls 10 are pressurized to be compressed, as described in the first embodiment.

Next, while the pressurization step is carried out, the bonding adhesive 40 interposed between the honeycomb core 80 and the upper skin 91 and between the honeycomb core 80 and the lower skin 92 is hardened at room temperature (hardening step). In this procedure, the upper skin 91 and the lower skin 92 are bonded respectively with the honeycomb core 80 so as to form a honeycomb sandwich panel.

According to the bonding method relating to this embodiment, the laminate P2 with an upper surface shape having a recess portion is pressurized through the silicon balls 10 so that the spherical bodies 10 made of silicon rubber are fluidized and deformed to match the upper surface shape having the recess portion. Thus, uniform pressure can be applied to the laminate P2. Accordingly, it is not necessary to manufacture the upper pressure plate 71 of the pressing machine 70 to match the upper surface shape of the laminate P2. Thus, there is no fear that the cost increases.

Fourth Embodiment

Next, description will be made on the fourth embodiment with reference to FIG. 4. In this embodiment, in the same manner as in the third embodiment, skins 91 and 92 are bonded with the upper and lower surfaces of a honeycomb core 80 by use of silicon balls 10 and a pressing machine 70 so as to form a honeycomb sandwich panel, and a bonding adhesive is hardened by heating.

In this embodiment, the upper pressure plate 71 of the pressing machine 70 is moved toward the lower pressure plate 72 so as to apply pressure to the laminate P2 through the silicon balls 10. After that, the pressing machine 70, the silicon balls 10 and the laminate P2 are heated at 180° C. by a heating tank 60 (see FIG. 4). By this heating, the silicon balls 10 are expanded to apply pressure to the laminate P2 (second pressurization step). At this time, the magnitude (second pressurizing value) of pressure applied to the laminate P2 by the silicon balls 10 can be established in accordance with the rate (pressing rate) with which the silicon balls 10 are pressurized to be compressed, in the same manner as in the second embodiment.

In addition, in this embodiment, a thermosetting bonding adhesive 40' is used in the same manner as in the second embodiment. This thermosetting bonding adhesive 40' can be hardened by heating the laminate P2 by the heating tank 60. That is, the second pressurization step and the hardening step are carried out concurrently.

According to the bonding method relating to this embodiment, by heating the silicon balls 10 to thereby expand the silicon balls 10, pressure can be applied to the laminate P2 surely. In addition, since the bonding adhesive 40' is of a thermosetting type, the hardening of this bonding adhesive 40' and the pressurization based on the thermal expansion of the silicon balls 10 can be carried out concurrently. Thus, the bonding method according to this embodiment is extremely efficiently. In addition, the second pressurizing value of the pressure applied to the laminate P2 can be established easily by use of the relationship between the "pressing rate" and the "second pressurizing value" based on a given experimental result.

Figure 4:
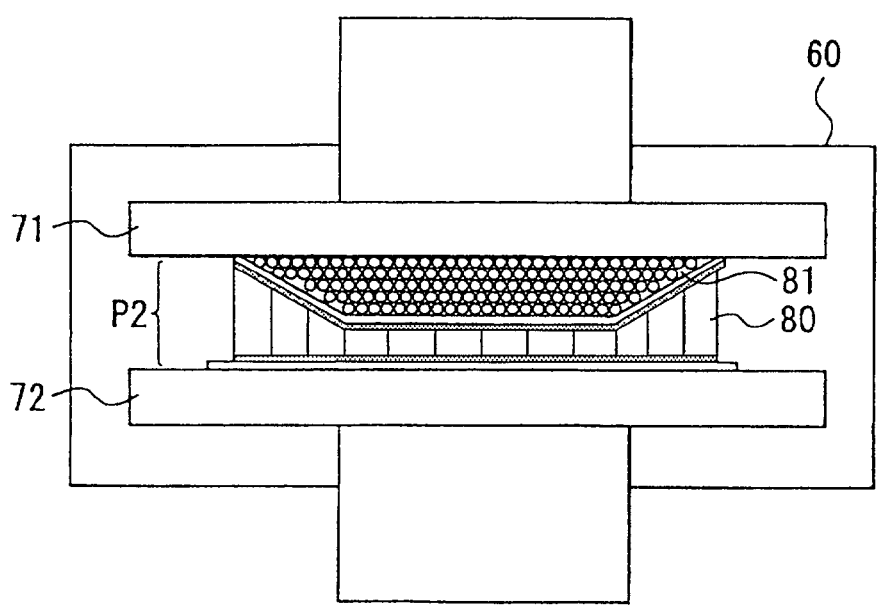
FIG. 4 is a side view for explaining a bonding method according to a fourth embodiment of the present invention, showing the state where a laminate is heated by a heating tank so as to be further pressurized.

Incidentally, although the shape of the recess portion 81 of the honeycomb core 80 is trapezoidal in section as shown in FIGS. 3 and 4 in the third and fourth embodiment, the shape is not limited thereto. If a closed space is formed between the laminate P2 and the upper pressure plate 71 of the pressing machine 70, the silicon balls 10 can be applied to a laminate P2 having any shape so as to apply uniform pressure to the laminate P2.

In the embodiments, when the silicon balls 10 are changed in filling rate, pressing rate, diameter, hardness, thermal expansivity or heating temperature, the magnitude of pressure (pressurizing value) applied by the silicon balls 101 is changed. A suitable pressurizing value can be established on the basis of the experimental result obtained by the free stack test shown in FIGS. 5A and 5B and Table-1. In a real manufacturing process, the pressurizing value can be established by setting the pressing rate at room temperature. Thus, the work becomes easy.

Here, the stowage height of the silicon balls 10 has a relationship to the filling rate, and the filling rate has a relationship to the pressurizing value. However, when the stowage height is increased to some extent, the filling rate converges in a substantially fixed value. Accordingly, when the stowage height of the silicon balls 10 reaches a predetermined value or higher, the change of the pressurizing value becomes as small as negligible. Accordingly, it is not necessary to set the stowage height of the silicon balls 10 to have the same value as the value (24 mm) in the free stack test. Also when the silicon balls 10 are stowed beyond this value, a pressurizing value substantially equal to the value in the free stack test can be obtained.

In addition, the pressurizing value in the single-layer flat stack test is smaller than the pressurizing value in the free stack test. Even in the case of the pressing rate 10% where the difference between the two pressurizing values is maximal, the pressurizing value in the single-layer flat stack test is about 60% of the pressurizing value in the free stack test, and there is not so large difference between the two pressurizing values. If a plurality of layers are stacked, the difference becomes smaller. Therefore, even when the stowage height of the silicon balls 10 is not as large as the value (24 mm) in the free stack test, there is no great disadvantage in bonding if the range of the minimal contact pressure described previously is taken into consideration.

That is, to determine a pressurizing value and a pressing rate of a real substance, it is not necessary to carry out a test simulating the real substance. As shown in FIGS. 5A and 5B, it is sufficient to carry out a model test in which the spherical bodies made of silicon rubber are charged into a vessel having a constant sectional area and compressed with a uniform distribution of a load on the spherical bodies of silicon rubber.

In addition, the silicon balls 10 used in the embodiments can be used as a core when a composite material is molded. Specifically, the silicon balls 10 are charged into a bag body, and arranged into a predetermined shape by a jig. In this state, the bag body is evacuated so that the shape is fixed. A prepreg is disposed around the bag body through a mold release agent. The prepreg and the bag body are covered with a vacuum bag film. The prepreg is heated and hardened while the covered portion is evacuated. A small hole is provided in the prepreg in advance. The bag body is broken, and the broken bag body and the silicon balls 10 are extracted from this small hole.

Fifth Embodiment

An embodiment of the present invention will be described below in detail with reference to the drawings. In the following embodiment, description will be made on a process for manufacturing a rectangular parallelepiped box-shaped structure (see FIGS. 10 and 11) measuring 50 mm in length by 60 mm in width by 25 mm in height by use of a manufacturing method according to the present invention. Each of plate-like bodies constituting the box-shaped structure is molded and hardened out of a carbon fiber reinforced composite material which uses an epoxy resin as its parent material.

In the manufacturing method according to the fifth embodiment, first, a plate-like body (hereinafter referred to as "lower portion plate-like body") 110d to be formed as a bottom wall of a box-shaped structure is disposed on a pedestal 130. Then, plate-like bodies (hereinafter referred to as "side portion plate-like bodies") 110s to be formed as side walls of the box-shaped structure are disposed on the respective sides of the lower portion plate-like body 110d through a thermosetting bonding adhesive, so as to form a rectangular parallelepiped box-like body 120 having an open portion 121, a bonding margin 122 extending inward the open portion, and a closable access hole 123 (see FIG. 6). Further, a plate-like body (hereinafter referred to as "upper portion plate-like body") 110u to be disposed on the upper portion of the box-like body 120 is prepared (see FIG. 6). For example, the thermosetting bonding adhesive may be a bonding adhesive made of a thermosetting resin typified by an epoxy resin.

A bonding margin is provided in each of the side portion plate-like bodies 110s so as to bond the side portion plate-like body 110s with the upper portion plate-like body 110u, the lower portion plate-like body 110d and other adjacent side portion plate-like bodies 110s. The thermosetting bonding adhesive is applied to the bonding margins, and disposition is made in the form described above. Thus, each side portion plate-like body 110s is temporarily fixed to the lower portion plate-like body 110d and other side portion plate-like bodies 110s so that the box-like body 120 is formed (see FIG. 6). In addition, margins provided in the respective side portion plate-like bodies 110s and for bonding the side portion plate-like bodies 110s with the upper portion plate-like body 110u are formed as the bonding margin 122 extending inward the open portion of the box-like body 120 (see FIG. 6).

Figure 6:
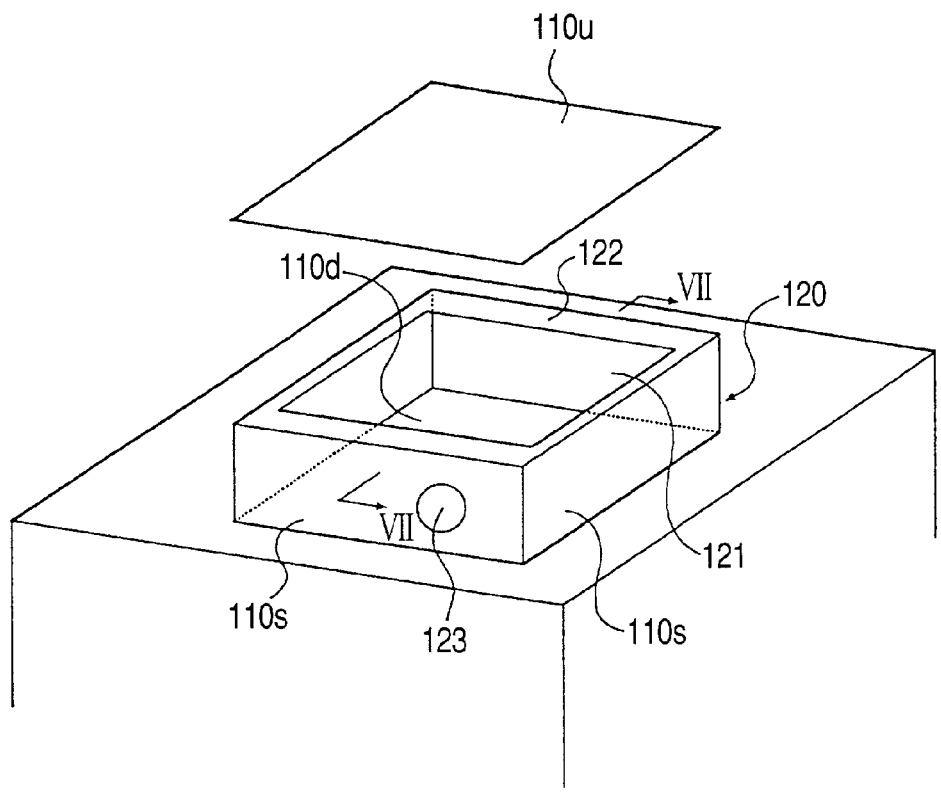
FIG. 6 is a perspective view showing the state where a box-like body for use in a manufacturing method according to an embodiment of the present invention has been mounted on a pedestal.

An access hole 123 having a diameter of 10 mm is provided in the side portion plate-like body 110s disposed as the front face of the box-like body 120 (see FIG. 6). This access hole 123 is provided for discharging a flexible mandrel 150 which will be described later. There is no particular limitation on the position, shape, size, and so on of the access hole 123 so long as the access hole 123 can fulfill the function.

Next, a side portion jig 141 is disposed in tight contact with the outside surfaces of the side portion plate-like bodies 110s of the box-like body 120, and the side portion jig 141 is fixed to the pedestal 130. When an upper portion jig 142 is disposed and fixed on the upper portion of the side portion jig 141, the side portion and upper portion jigs 141 and 142 have a function of preventing the upper portion plate-like body 110u fixed on the upper portion of the box-like body 120 from being displaced in position. In addition, when the flexible mandrel 150 is expanded to apply pressing force from the inside of the box-like body 120 in a heating step which will be described later, the side portion and upper portion jigs 141 and 142 have a function of applying pressing force to respective bonding portions through the flexible mandrel 150 and the side portion and upper portion jigs 141 and 142.

Figure 7:
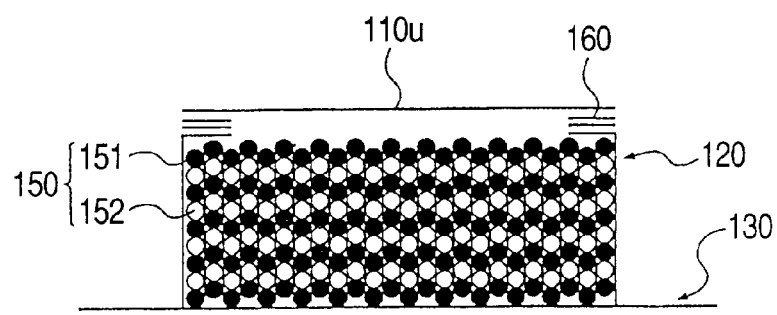
FIG. 7 is a sectional view taken on VII—VII line in FIG. 6, showing the state where a flexible mandrel has been charged into the box-like body in FIG. 6 and an upper portion plate-like body has been disposed.

Next, the flexible mandrel 150 formed by mixing glass beads 152 into silicon rubber beads 151 is charged into the box-like body 120 through the open portion 121 of the box-like body 120 (box-like body formation step: see FIG. 7). At this time, the flexible mandrel 150 is charged to reach the upper ends of the side portion plate-like bodies 110s (that is, the lower surface of the flange 122 of the box-like body 120) as shown in FIG. 7.

In this embodiment, silicon rubber beads each having a diameter of 4 mm and a durometer hardness of 150 are used as the silicon rubber beads 151 forming the flexible mandrel 150, and the glass beads are set to have a diameter of 4 mm. The expansion rate of the glass beads due to heating is negligible in a temperature range required for hardening the thermosetting bonding adhesive.

Next, the upper portion plate-like body 110u is disposed on the flange 122 of the box-like body 120 filled with the flexible mandrel 150, through a thermosetting bonding adhesive 160, so that a rectangular parallelepiped box-shaped structure with a closed space is formed temporarily (closed space formation step: see FIG. 7). In this step, the circumferential edge portion of the upper portion plate-like body 110u is temporarily fixed to the flange 122 of the box-like body 120 through the thermosetting bonding adhesive 160. Incidentally, though not shown, very small holes are provided in the upper portion plate-like body 110u so as to let out the air from the inside of the box-like body 120 expanded in the heating step which will be described later.

Figure 8:
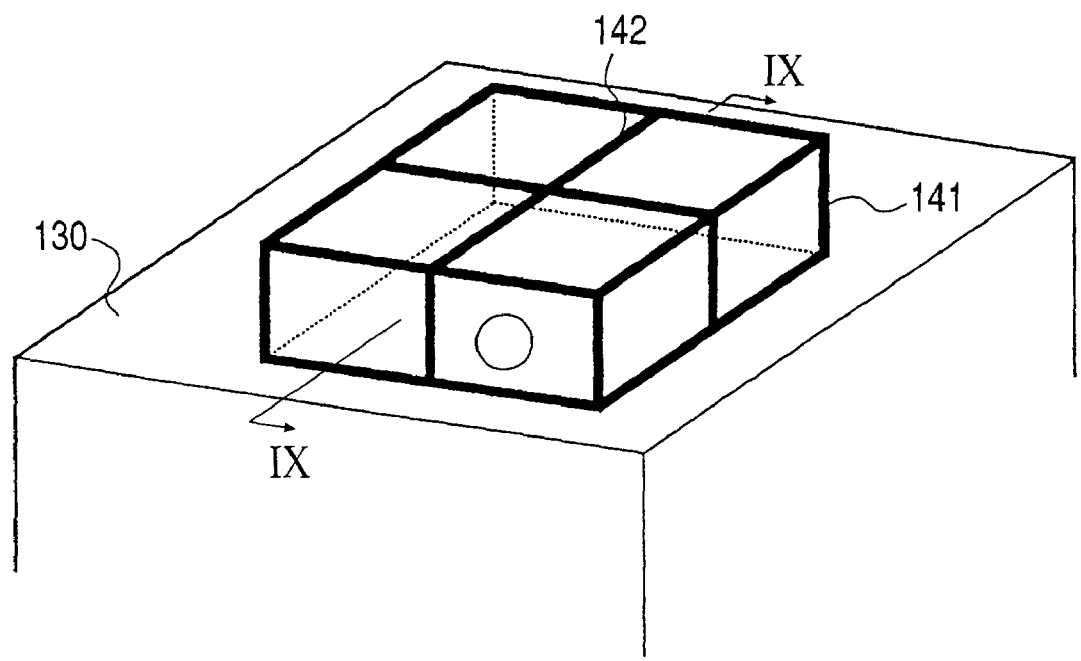
FIG. 8 is a perspective view showing the state where jigs have been disposed on the outsides of the box-like body and the upper portion plate-like body in FIG. 7.
Figure 9:
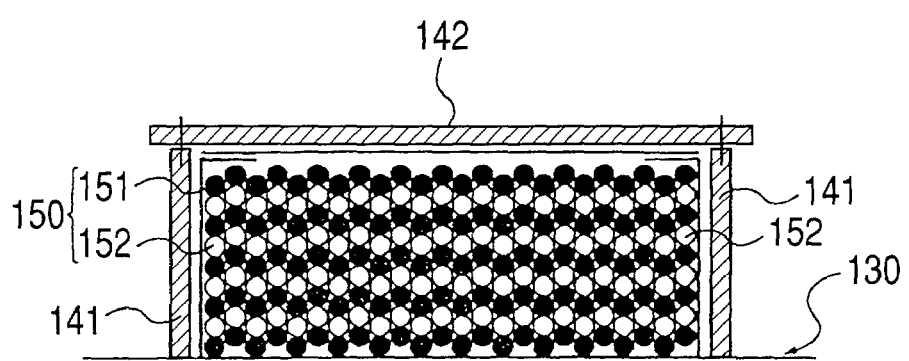
FIG. 9 is a sectional view taken on line IX—IX in FIG. 8.

Next, as shown in FIGS. 8 and 9, the upper portion jig 142 is disposed on the top of the upper portion plate-like body 110u, and the upper portion jig 142 is fixed to the side portion jig 141 so as to fix the upper portion plate-like body 110u to the box-like body 120. That is, the upper portion plate-like body 110u and the box-like body 120 are surrounded by the pedestal 130, the side portion jig 141 and the upper portion jig 142. In this embodiment, as shown in FIG. 8, the side portion jig 141 and the upper portion jig 142 reinforce particularly the portions where the lower portion plate-like body 110d are bonded with the respective side portion plate-like bodies 110s, the portions where the side portion plate-like bodies 110s are bonded with one another, and the portions where the respective side portion plate-like bodies 110s are bonded with the upper portion plate-like body 110u.

Next, in the state where the upper portion plate-like body 110u and the box-like body 120 are surrounded by the pedestal 130, the side portion jig 141 and the upper portion jig 142, an oven is used to heat the upper portion plate-like body 110u and the box-like body 120 at 180° C. for 5 minutes (heating step). In this heating step, the flexible mandrel 150 charged into the box-like body 120 is expanded so that pressing force acts on the flange 122 of the box-like body 120 from inside the box-like body 120 toward the upper portion plate-like body 110u.

The flange 122 of the box-like body 120 and the circumferential edge portion of the upper portion plate-like body 110u are fixed in the state where The flange 122 and the circumferential edge portion of the upper portion plate-like body 110u are held among the side portion jig 141, the upper portion jig 142 and the flexible mandrel 150. Accordingly, when the flexible mandrel 150 is expanded to apply the pressing force in the heating step, the thermosetting bonding adhesive 160 disposed between the flange 122 of the box-like body 120 and the circumferential edge portion of the upper portion plate-like body 110u undergoes hardening reaction under the heating by the oven and the pressing force. As a result, the circumferential edge portion of the upper portion plate-like body 110u is firmly bonded with the flange 122 of the box-like body 120.

Figure 10:
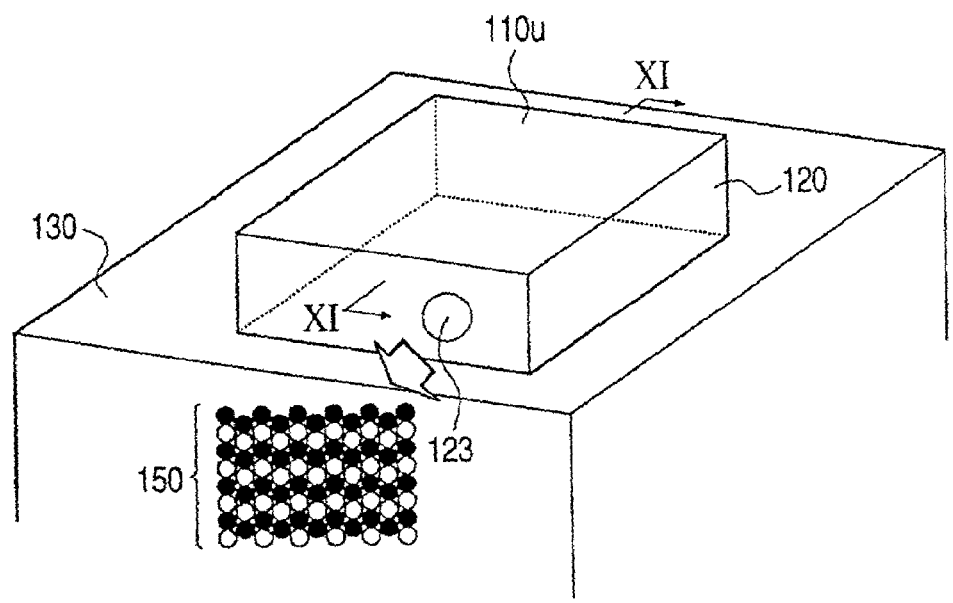
FIG. 10 is a perspective view showing the state where the flexible mandrel is discharged from an access hole of a box-shaped structure formed via a heating step carried out in the state of FIG. 8.
Figure 11:
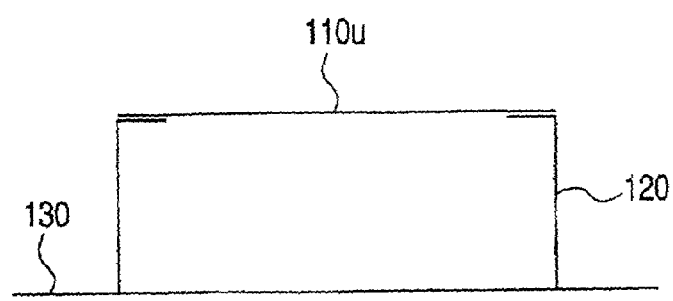
FIG. 11 is a sectional view taken on line XI—XI in FIG. 10.

Next, after the side portion jig 141 and the upper portion jig 142 are cooled to the room temperature, they are removed from the box-shaped structure, and the flexible mandrel 150 charged into the box-like body 120 is discharged from the access hole 123 provided in the box-like body 120 (discharge step, see FIG. 10). After that, the access hole 123 is closed, and a desired box-shaped structure is obtained (see FIG. 11).

The flexible mandrel 150 used in the manufacturing method according to this embodiment has the silicon rubber beads 151 as its main constituent components. Accordingly, the flexible mandrel 150 can be deformed freely in accordance with the rectangular parallelepiped closed space defined by the box-like body 120 and the upper portion plate-like body 110u. In addition, the silicon rubber beads 151 forming the flexible mandrel 150 can be expanded in the heating step and are flexible individually. Accordingly, each silicon rubber bead heated and expanded to be thereby brought into contact with a surface forming the closed space is deformed along the contact surface. Thus, uniform pressing force can be applied all over the surfaces forming the closed space.

Thus, sufficient pressing force can be applied to the portions where the lower portion plate-like body 110d are bonded with the respective side portion plate-like bodies 110s, the portions where the side portion plate-like bodies 110s are bonded with one another, and the portions where the respective side portion plate-like bodies 110s are bonded with the upper portion plate-like body 110u. Accordingly, the box-shaped structure can be manufactured only by bonding without going through a rivet coupling step. As a result, complicated works such as the work of forming rivet holes, the work of fastening rivets, and so on, can be omitted, so that the labor for manufacturing can be reduced on a large scale.

In addition, when the manufacturing method according to this embodiment is used, the box-shaped structure can be manufactured without going through a rivet coupling step. Accordingly, for example, even when the box-like body 120 or the upper portion plate-like body 110u involved in this embodiment is large in size, there is no fear that the weight of the box-shaped structure increases due to the use of rivets. Thus, the manufacturing method according to this embodiment can be applied also to the manufacture of a wing box portion (box-shaped structure) of a wing of an aircraft extremely preferably. Further, the cost to manufacture rivets can be saved, so that the manufacturing cost can be reduced on a large scale.

Further, if the manufacturing method according to this embodiment is applied so that a flexible mandrel is charged into a closed space surrounded by a dry preform, a box-shaped structure can be manufactured without using any metal mandrel that has been required for molding the box-like body 120 integrally in the RTM method. Thus, it is not necessary to prepare a large number of kinds of metal mandrels matching the size and shape of the box-shaped structure. In addition, the flexible mandrel 150 used for manufacturing the box-shaped structure can be discharged from the access hole after the manufacture and reused in the next manufacturing process. Thus, the manufacturing cost can be reduced on a large scale.

Furthermore, if the manufacturing method according to this embodiment is applied, a box-shaped structure can be manufactured without using any metal mandrel that has been required for molding the box-like body 120 integrally in the RTM method, and the flexible mandrel 150 can be discharged from the access hole easily after the manufacture. Accordingly, there is no difficulty in demolding work, unlike the case where the metal mandrels are used. Thus, the manufacturing cycle can be accelerated.

Incidentally, in the embodiment, the flexible mandrel 150 was charged into the whole internal space of the box-like body 120 because pressure of about 1 to $3\times10^{-2}$ MPa was required for bonding. However, the filling amount of the silicon rubber beads 151 forming the flexible mandrel 150 can be varied in accordance with pressure required for bonding.

For example, the relationship between the compression ratio of the silicon rubber beads 151 and the pressure (that is, how much pressure can be applied to a substance when the silicon rubber beads 151 are compressed into a predetermined volume) is examined by use of a universal testing machine or the like. By use of this relationship, the compression ratio of the silicon rubber beads 151 for obtaining pressure required for bonding is obtained. Next, the required volume (filling amount) of the silicon rubber beads 151 can be determined suitably from the relationship between the obtained compression ratio and the volume of the box-like body 120.

Incidentally, although the flexible mandrel 150 was formed out of the silicon rubber beads 151 and the glass beads 152 in the embodiment, the flexible mandrel 150 may be formed out of only the silicon rubber beads 151.

Further, although the box-like body 120 was made of plate-like bodies molded and hardened in the embodiment, the box-like body 120 may be made of plate-like bodies molded and primarily hardened in place of the plate-like bodies molded and hardened. In this case, the plate-like bodies are secondarily hardened in the heating step. At this time, in order to prevent the plate-like bodies from being formed into a shape of the silicon rubber beads 151 and the glass beads 152 having spherical shapes, because of the pressure of the plate-like bodies, it is preferable that heat resistant plates having hardness as high as that of the silicon rubber beads 151 are disposed between the respective plate-like bodies (the lower portion plate-like body 110d, the side portion plate-like bodies 110s and the upper portion plate-like body 110u) and the silicon rubber and glass beads 151 and 152.

Further, although the flexible mandrel 150 was charged directly into the box-like body 120 and heated to expand in the embodiment, the flexible mandrel 150 may be charged into a predetermined bag film. In this case, the air is evacuated from this bag film so that the shape of the bag film is adjusted. The bag film with the flexible mandrel 150 is received in the box-like body 120 and heated to expand. In this case, a portion of the bag film near the access hole 123 is broken in the discharge step so that the flexible mandrel 150 inside the bag film is discharged.

Figure 12:
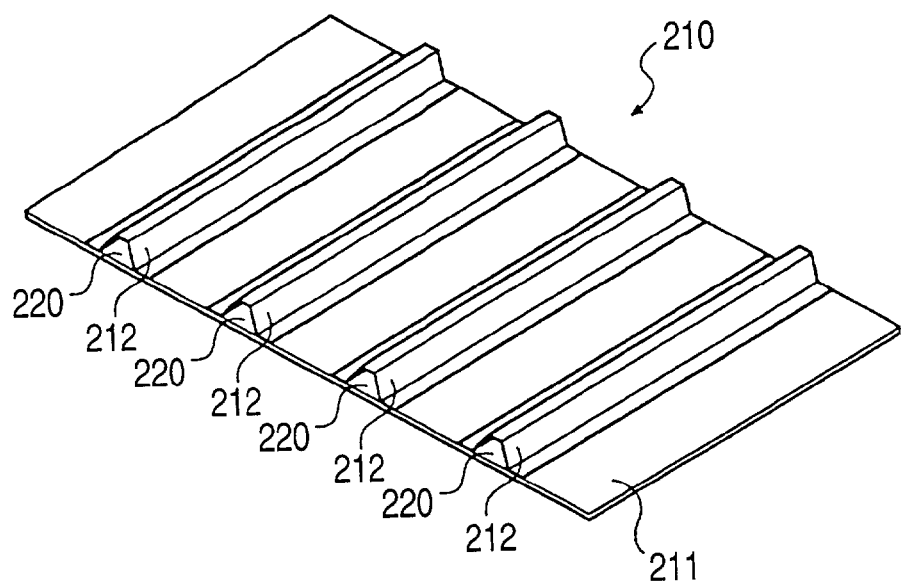
FIG. 12 is a perspective view showing a stiffened panel manufactured in a manufacturing method according to an embodiment of the present invention.
Figure 13:
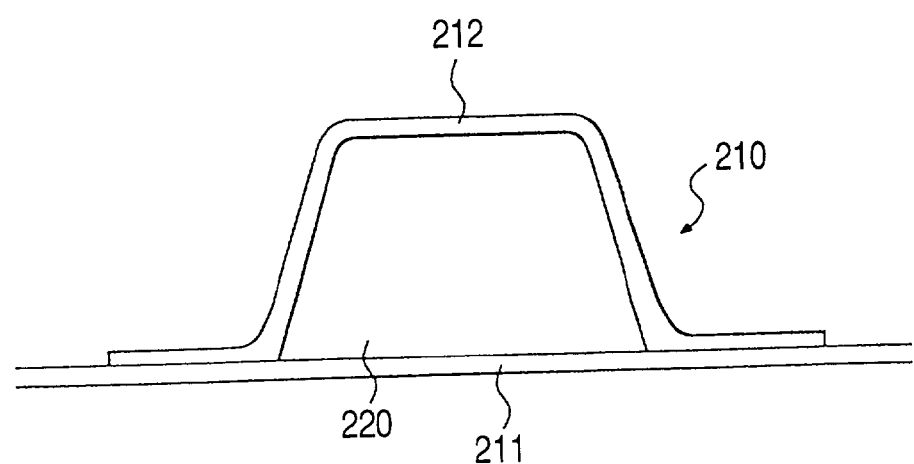
FIG. 13 is an enlarged side view in the vicinity of a stiffener of the stiffened panel shown in FIG. 12.

Further, although the side portion jig 141 and the upper portion jig 142 were disposed on the outsides of the upper portion plate-like body 110u and the box-like body 120 in the embodiment, the step of disposing those jigs can be omitted if the pressure required for bonding is comparatively low and the plate-like body has rigidity high enough to have negligible bending deformation due to the pressing force from the inside.

a sixth to ninth embodiments of the present invention will be described below in detail with reference to the drawings. A composite material product manufactured in a manufacturing method according to each embodiment is a stiffened panel 210 to be incorporated in a wing of an aircraft. As shown in FIGS. 12 and 13, the stiffened panel 210 has a skin 211 and stiffeners 212. As is apparent from FIG. 13, when each stiffener 212 is cut perpendicularly to its lengthwise direction, the stiffener 212 is shaped like a hat in section. A hollow portion 220 is formed by the skin 211 and the stiffener 212 having such a hat-like shape in section.

Sixth Embodiment

In this embodiment, description will be made on a method for manufacturing a stiffened panel in a so-called RFI (Resin-Film-Infusion) method. First, a fiber reinforced fabric material (hereinafter referred to as "skin fabric") 211' for molding the skin 211 and a fiber reinforced fabric material (hereinafter referred to as "reinforced fabric") 212' for molding the stiffeners 212 are prepared. The skin fabric 211' and the reinforced fabric 212' are made of reinforced fibers such as glass fibers, carbon fibers, aramid fibers or alumina fibers interweaved into a tabular shape. Different kinds of reinforced fibers, for example, glass fibers and carbon fibers may be interweaved with each other.

Examples of kinds of weaves include a plain weave, a twill weave, and a satin weave. Incidentally, it is preferable that reinforced fibers are interweaved cubically (three-dimensionally) so as to be disposed in three directions, that is, longitudinally, latitudinally and altitudinally. In this case, a stiffened panel superior in strength can be manufactured. The thickness of the skin fabric 211' and the thickness of the reinforced fabric 212' can be determined suitably in accordance with the application of the stiffened panel to be manufactured.

Figure 15:
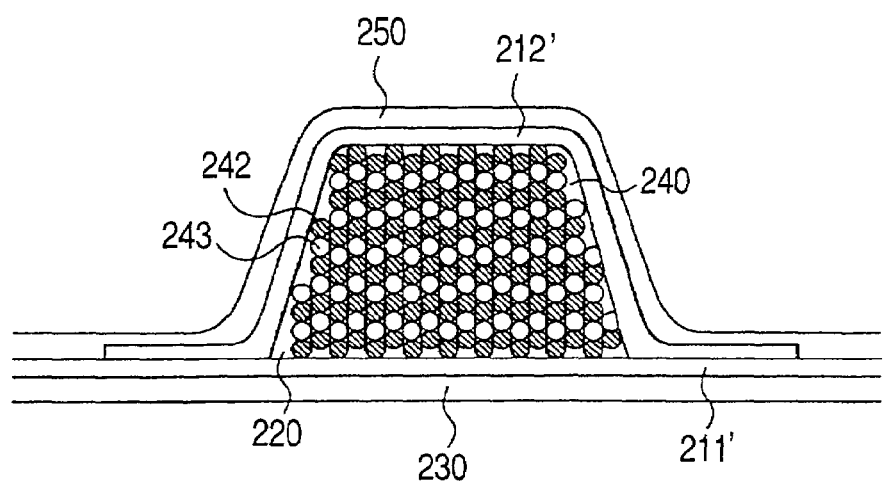
FIG. 15 is an explanatory view for explaining the manufacturing method according to the embodiment of the present invention.

Next, a lower mold jig 230 is disposed as shown in FIG. 15. The surface shape of the lower mold jig 230 is set to be identical to the surface shape of the skin 211 of the stiffened panel 210 to be manufactured. The lower mold jig 230 is designed to have: rigidity which is high enough not to be deformed by the pressure applied at the time of molding; and to have heat resistance which is high enough to withstand heating in a heating step which will be described later. If the lower mold jig 230 has such properties, there is no limitation on the structure and material of the lower mold jig 230. Incidentally, it is preferable that a heating unit is built in the lower mold jig 230. In this case, it is not necessary to provide a large-scale heating unit such as an autoclave or an oven.

Next, a not-shown thermosetting resin film is disposed on the lower mold jig 230 (film disposition step). This thermosetting resin film is heated and melted in a resin melting step which will be described later. In the resin melting step, the material of thermosetting resin film is impregnated into the skin fabric 211' and the reinforced fabric 212', and hardened. The material of the thermosetting resin film is not limited especially so long as it is thermosetting resin for RFI. Particularly, epoxy resin is preferable. The thickness of the thermosetting resin film can be determined suitably in accordance with the size of the stiffened panel 210 to be manufactured.

Next, the skin fabric 211' is disposed on the thermosetting resin film (skin material disposition step: see FIG. 15). A flexible mandrel 240 is disposed on the skin fabric 211' (flexible mandrel disposition step: see FIG. 15). Further, the reinforced fabric 212' is disposed on the skin fabric 211' so as to cover the flexible mandrel 240 (reinforced fabric disposition step: see FIG. 15). The edge portions of the reinforced fabric 212' are sewed onto the skin fabric 211'.

Figure 14:
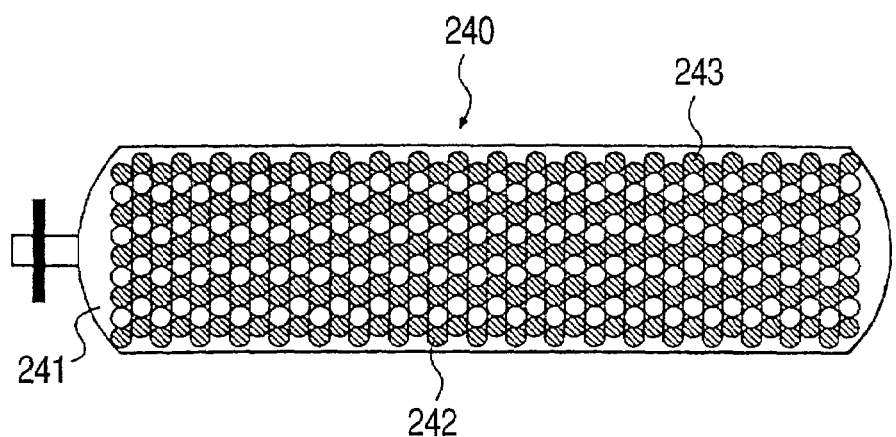
FIG. 14 is a schematic view of a flexible mandrel used in the manufacturing method according to the embodiment of the present invention.

The flexible mandrel 240 is formed by mixing beads 242 made of silicon rubber (hereinafter referred to as "silicon beads") and beads 243 made of glass (hereinafter referred to as "glass beads") and charging them into a bag body 241, as shown in FIG. 14. The bag body 241 forming the flexible mandrel 240 is stretchable in accordance with the expansion/contraction of the silicon beads 242 charged into the bag body 241. In addition, the bag body 241 has heat resistance high enough to withstand heating in the heating step which will be described later. The bag body 241 can be prepared by use of silicon rubber, fluorine-based rubber, or the like.

The diameter and thermal expansivity of the silicon beads 242, the diameter of the glass beads 243, the mixing ratio between the silicon beads 242 and the glass beads 243, and the filling rate of the beads to the internal volume of the bag body 241 can be determined suitably in accordance with the size of the stiffened panel 210 to be manufactured, and the pressure required for molding the skin 211 and the stiffener 212. In this embodiment, setting is made so that the diameters of both the two kinds of the beads are in a range of from 2 mm to 5 mm, the thermal expansivity of the silicon beads 242 is $2.8 \times 10^{-4}$ $K^{-1}$, the mixing ratio of the silicon beads 242 to the glass beads 243 is 40:60, and the filling rate of the beads to the internal volume of the bag body 241 (that is, the volume of the hollow portion 220) is 95%.

Incidentally, the shapes of the silicon beads 242 and the glass beads 243 are not limited to spherical shape so long as the flexible mandrel 240 is deformable freely to have a function of expansion in accordance with heating. In addition, the flexible mandrel 240 is not limited to a combination of the silicon beads 242 and the glass beads 243. The flexible mandrel 240 may be formed out of beads of three or more kinds of materials different in thermal expansivity. Alternatively, the flexible mandrel 240 may be made of beads of one kind of material so long as appropriate pressure can be discovered. Further, when the flexible mandrel 240 is made of beads of two or more kinds of materials different in thermal expansivity, the mixing ratio of the beads may be changed partially so that the application of pressure can be changed partially.

In addition, in this embodiment, before the flexible mandrel 240 is disposed, the flexible mandrel 240 is received in a forming mold having the same shape as the internal shape of the hollow portion 220. The air is evacuated from the bag body 241 of the flexible mandrel 240 so that the shape of the flexible mandrel 240 is fixed temporarily. In addition, the opposite end portions of the flexible mandrel 240 are protruded beyond the opposite end portions of the reinforced fabric 212' respectively. This arrangement is made for the purpose of preventing the thermosetting resin from flowing out by sealing gaps between the protruding portions of the flexible mandrel 240 and the end portions of an upper mold jig 250 which will be described later with a sealer when the thermosetting resin is impregnated into the skin fabric 211' and the reinforced fabric 212' in the resin introduction step which will be described later.

Next, the upper mold jig 250 is disposed on the skin fabric 211' and the reinforced fabric 212' (upper mold jig disposition step: see FIG. 15). The shape of the reinforced fabric 212' is molded by the flexible mandrel 240 to some extent. However, a gap is often produced between the side surface portion of the flexible mandrel 240 and the reinforced fabric 212'. Therefore, such a gap is eliminated by the disposition of the upper mold jig 250.

It is preferable that the upper mold jig 250 is paired with the flexible mandrel 240 so as to have rigidity which is high enough to mold the reinforced fabric 212' and rigidity which is high enough to withstand the pressure at the time of the molding as described above. In addition, it is preferable that the upper mold jig 250 is designed to have both air tightness and liquid tightness high enough to function effectively in a discharge step and the resin introduction step which will be described later. If the upper mold jig 250 has such properties, there is no limitation on the material of the upper mold jig 250. The upper mold jig 250 can be manufactured by use of rubber, metal material, synthetic resin, or the like.

Next, the space surrounded by the upper mold jig 250 and the lower mold jig 230 is evacuated (evacuation step). As the method of evacuation, there can be employed a related-art method as follows. That is, one or more evacuation holes are formed in the upper mold jig 250 or the lower mold jig 230. These evacuation holes are connected to a vacuum device such as a vacuum pump through evacuation pipes. Then, the air in the space is exhausted by the vacuum device. This evacuation step is a step in which the thermosetting resin is impregnated into the skin fabric 211' and the reinforced fabric 212' while vacuum pressure is applied to prevent bubbles from remaining in a product.

Next, while the evacuation is carried out, the thermosetting resin film disposed between the lower mold jig 230 and the skin fabric 211' is melted by heating. This heated and melted thermosetting resin from the thermosetting resin film is impregnated into the skin fabric 211' and the reinforced fabric 212'. The heating can be provided by a heating unit built in the lower mold jig 230, an oven, or the like, as described previously. At this time, for example, the resin melting temperature is set to be approximately in a range of from 40° C. to 80° C. when the thermosetting resin film is formed out of epoxy resin.

Next, the thermosetting resin impregnated into the skin fabric 211' and the reinforced fabric 212' is hardened by heating (heating step). The resin hardening temperature is approximately in a range of from 80° C. to 200° C. when the thermosetting resin is epoxy resin.

The upper mold jig 250 and the lower mold jig 230 are removed from the stiffened panel 210 molded via these steps. The bag body 241 of the flexible mandrel 240 is opened, and the silicon beads 242 and the glass beads 243 charged into the bag film are discharged to the outside (beads discharge step). Finally, the bag body 241 is removed from the hollow portion 220.

According to the manufacturing method according to this embodiment, the flexible mandrel 240 which is deformable freely in accordance with the internal shape of the hollow portion 220 is used. Accordingly, uniform pressure can be applied to the skin fabric 211' and the reinforced fabric 212'. As a result, the stiffened panel 210 with extremely high quality can be obtained. In addition, since the flexible mandrel 240 can be deformed freely, the flexible mandrel 240 can be removed from the hollow portion 220 easily after molding. Accordingly, the labor for manufacturing can be reduced on a large scale. Further, the flexible mandrel 240 can be used repeatedly plural times. Accordingly, the cost for manufacturing can be reduced on a large scale.

In addition, according to the manufacturing method relating to this embodiment, the flexible mandrel 240 which does not need processing accuracy as stringent as a metal mandrel is used. Accordingly, the cost for manufacturing the mandrel can be suppressed. As a result, the cost for manufacturing the stiffened panel 210 can be also reduced on a large scale. In addition, the flexible mandrel 240 is lighter in weight than the metal mandrel, so that the flexible mandrel 240 is extremely easy to handle. As a result, the labor for manufacturing can be reduced on a large scale.

Further, according to the manufacturing method relating to this embodiment, the flexible mandrel 240 having the silicon beads 242 and the glass beads 243 as its constituent components is used. Accordingly, the magnitude of the pressure applied to the skin fabric 211' and the reinforced fabric 212' can be controlled by adjusting the filling rate of the silicon beads 242 and the glass beads 243, and so on. As a result, the stiffened panel 210 with extremely high quality can be obtained.

Furthermore, according to the manufacturing method relating to this embodiment, a thermosetting resin film is disposed. This thermosetting resin film is heated and melted so that thermosetting resin is impregnated into the skin fabric 211' and the reinforced fabric 212', and then hardened. Since the thermosetting resin film can be prepared extremely easily and handled easily, the labor and cost for manufacturing can be reduced.

Seventh Embodiment

In a seventh embodiment, description will be made on a method for manufacturing a stiffened panel 210 by use of a so-called RTM (Resin-Transfer-Molding) method. Description will be omitted on steps the same as those in the manufacturing method according to the sixth embodiment.

In this embodiment, a thermosetting resin film is not disposed between a lower mold jig 230 and a skin fabric 211', but the skin fabric 211' is disposed directly on the lower mold jig 230 (skin material disposition step). After this step, the flexible mandrel 240 used in the manufacturing method according to the sixth embodiment is disposed on the skin fabric 211' (flexible mandrel disposition step). A reinforced fabric 212' is disposed on this flexible mandrel 240 (reinforced material disposition step). The edge portions of the reinforced fabric 212' are sewed onto the skin fabric 211'.

In addition, in this embodiment, after the space surrounded by an upper mold jig 250 and the lower mold jig 230 is evacuated in an evacuation step, thermosetting resin is introduced into this space from the outside by vacuum pressure in the evacuation step and resin compression so as to be impregnated into the skin fabric 211' and the reinforced fabric 212' (resin introduction step). At this time, the thermosetting resin is supplied from a resin tank provided externally, and a resin introduction pipe connected to the resin tank is connected to the lower mold jig 230. The liquid thermosetting resin in the resin tank is introduced into the space by the vacuum pressure and the resin compression. After that, the impregnated thermosetting resin is heated and hardened in a heating step.

Eighth Embodiment

In an eighth embodiment, description will be made on a method for manufacturing a stiffened panel 210 by use of a prepreg lamination method. Description will be omitted on steps the same as those in the manufacturing method according to the sixth embodiment.

In this embodiment, first, prepregs for the skin and the stiffeners are prepared. The prepregs in the present invention mean thin sheet-like products in which unhardened thermosetting resin has been impregnated into reinforced fibers. Examples of the reinforced fibers forming the respective prepregs include glass fibers, carbon fibers, aramid fibers, and alumina fibers. On the other hand, examples of the thermosetting resin include epoxy resin, polyester resin, and phenolic resin.

In this embodiment, the prepreg for the skin is disposed on a lower mold jig 230 (skin material disposition step). At this time, a prepreg sheet having a desired thickness may be disposed, or a plurality of comparatively thin prepreg sheets may be laminated and disposed. After this skin material disposition step, the flexible mandrel 240 used in the manufacturing method according to the sixth embodiment is disposed on the prepreg for the skin (flexible mandrel disposition step). The prepreg for the stiffeners is disposed on this flexible mandrel 240 (stiffener material disposition step).

Since the prepregs are unhardened, the prepregs are easily deformed due to pressure in a resin hardening step. In order to prevent such deformation, in this embodiment, the prepreg for the stiffeners is covered with a cowl panel made of metal, and an upper mold jig 250 is then disposed thereon (upper mold jig disposition step). In this embodiment, the upper mold jig 250 is formed as a bagging film superior in heat resistance. In addition, in this embodiment, heat and pressure are applied by use of an autoclave in a heating step.

Ninth Embodiment

In a ninth embodiment, description will be made on a method for manufacturing a stiffened panel 210 by use of a so-called co-bonding method. Description will be omitted on steps the same as those used in the manufacturing method according to the sixth embodiment.

In this embodiment, a prepreg for the skin is laminated in the same manner as in the eighth embodiment. Alternatively, stiffeners 212 are manufactured in advance by impregnating thermosetting resin into reinforced fibers in an RTM method or an RFI method and then primarily hardening the thermosetting resin. The stiffeners 212 maybe formed by laminating a prepreg for the stiffeners and primarily hardening the laminated prepreg.

In addition, in this embodiment, the following steps are carried out in the same manner as in the eighth embodiment. That is, the prepreg for the skin is disposed on a lower mold jig 230 (skin material disposition step). The flexible mandrel 240 used in the manufacturing method according to the sixth embodiment is disposed on the prepreg for the skin (flexible mandrel disposition step). The primarily hardened stiffeners 212 are disposed on this flexible mandrel 240 (stiffener material disposition step). Incidentally, since the primarily hardened stiffeners 212 have rigidity high enough to withstand pressure in a heating step, it is not necessary to dispose a cowl plate made of metal as used in the eighth embodiment.

According to the manufacturing methods according to the eighth and ninth embodiments, even in the case of employing a so-called prepreg method or a so-called co-bonding method which has been heretofore employed, a high quality stiffened panel can be obtained by use of the flexible mandrel 240. That is, an existing prepreg manufacturing apparatus, an autoclave, and so on, can be used effectively- for manufacturing a stiffened panel with extremely high quality.

Incidentally, in the sixth and seventh embodiments, the skin fabric 211' is disposed on the lower mold jig 230, the flexible mandrel 240 is disposed thereon, and the reinforced fabric 212' is then disposed to cover the flexible mandrel 240. That is, the reinforcement material disposition step is carried out after the flexible mandrel disposition step. Alternatively, the stiffener material disposition step may be carried out before the flexible mandrel disposition step.

That is, the reinforced fabric 212' is disposed on the skin fabric 211' in advance (stiffener material disposition step). The edge portions of the reinforced fabric 212' extending lengthwise are sewed onto the skin fabric 211' so as to form a hollow portion 220 to which the flexible mandrel 240 can be inserted. The flexible mandrel 240 may be inserted into this hollow portion 220 (flexible mandrel disposition step).

In addition, in the seventh embodiment, the introduction and impregnation of thermosetting resin are carried out by vacuum pressure and resin compression. Alternatively, the thermosetting resin may be introduced only by vacuum pressure so as to be impregnated into the skin fabric 211' and the reinforced fabric 212', and then hardened. In this case, since resin compression for impregnating the resin is not required, the labor and cost for manufacturing can be further reduced.

Figure 16:
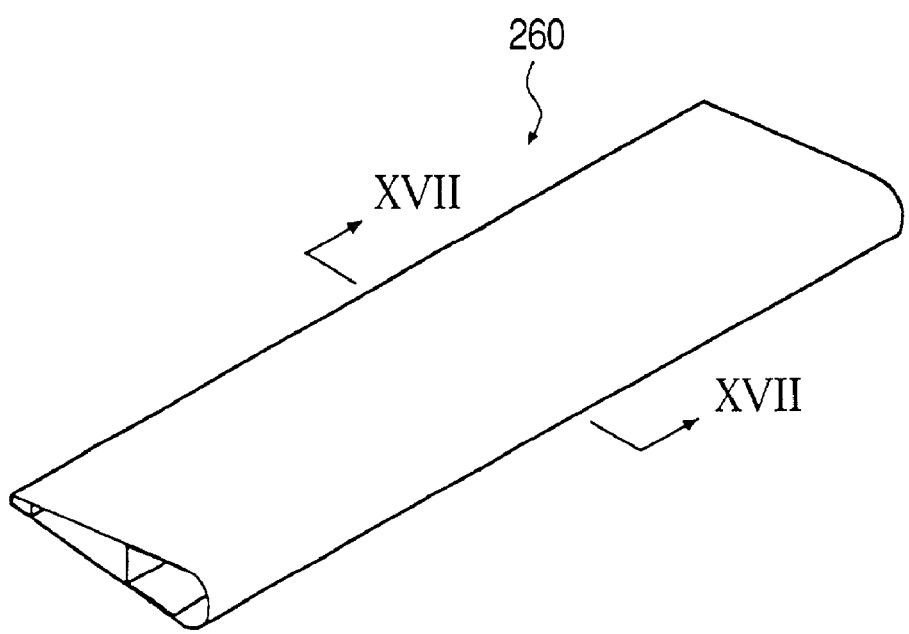
FIG. 16 is a perspective view of a movable wing which can be manufactured in a manufacturing method according to the present invention.
Figure 17:
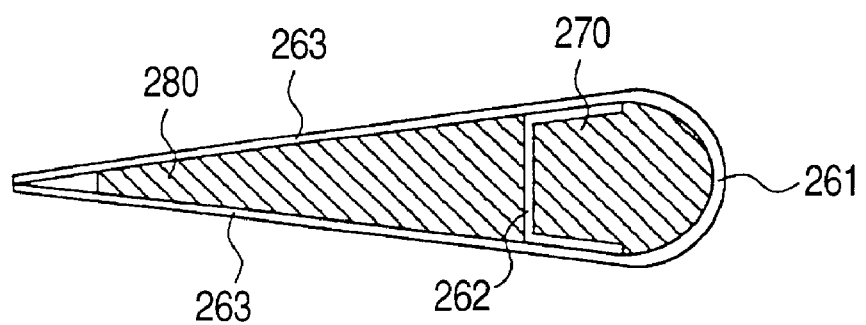
FIG. 17 is an enlarged sectional view taken on line XVII—XVII in the movable wing shown in FIG. 16.

In addition, according to any one of the sixth to ninth embodiments of the present invention, the manufacturing method is applied to the manufacturing of the stiffened panel 210 provided with stiffeners each having a hat-like shape in section. Alternatively, this manufacturing method is applicable likewise to the manufacturing of other composite material products having hollow portions. For example, as shown in FIG. 16, a movable wing 260 having a front hollow portion 270 formed out of a leading edge portion 61 and a spar portion 262 and a rear hollow portion 280 formed out of the spar portion 262 and upper and lower skins 263 can be manufactured in a procedure similar to that in any one of the embodiments.

A tenth embodiment of the present invention will be described below in detail with reference to the drawings. In the following embodiment, description will be made on a process for manufacturing a rectangular parallelepiped box-shaped structure 301 with a closed space by use of a manufacturing method according to the present invention. Incidentally, in this embodiment, description will be made on an example in which the box-shaped structure 301 made of a fiber reinforced resin composite material is manufactured by use of a thermosetting bonding adhesive.

Figure 18:
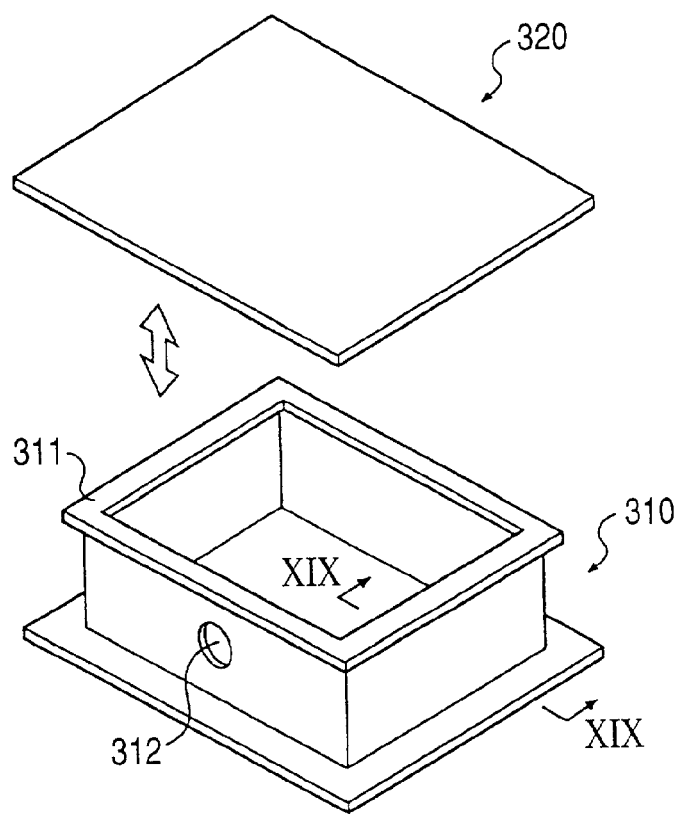
FIG. 18 is a perspective view showing a box-like body and a skin constituting a box-shaped structure manufactured in a manufacturing method according to an embodiment of the present invention.
Figure 24:
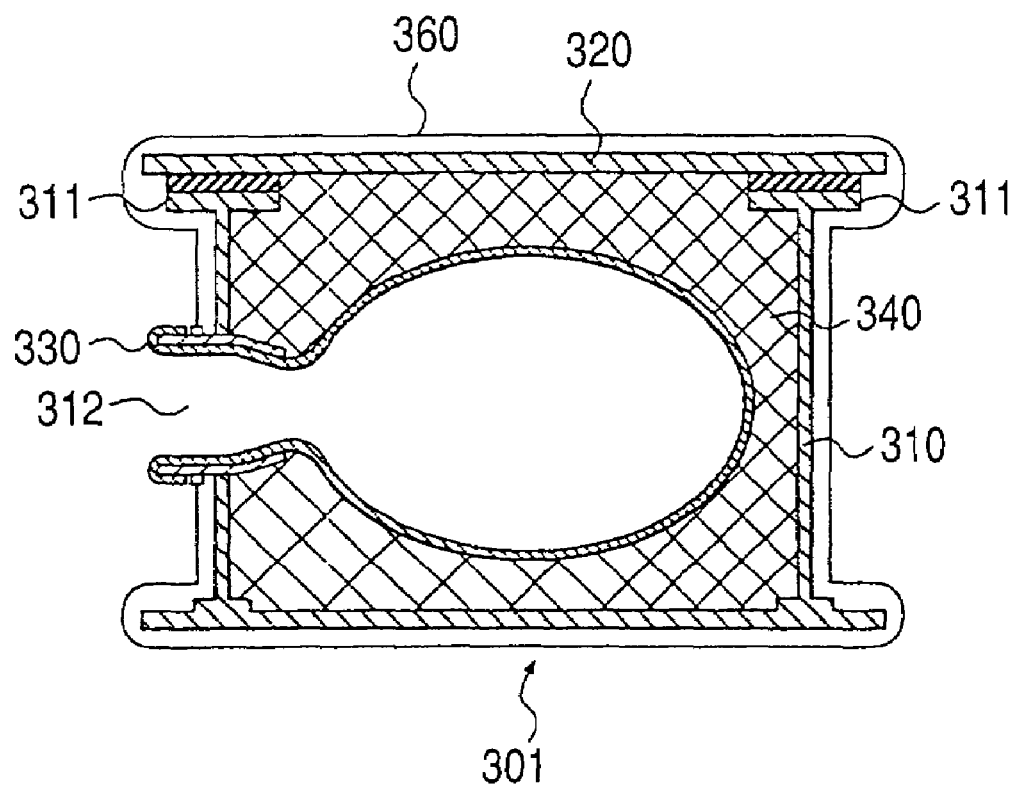
FIG. 24 is a sectional view taken on line XXIII—XXIII in FIG. 22, showing the state where the pressure bag has been expanded in an evacuation step of the manufacturing method according to the embodiment of the present invention, so that pressing force using the atmospheric pressure has been applied to the interior of the box-shaped structure shown in FIG. 22.

In the manufacturing method according to this embodiment, first, a box-like body 310 and a skin 320 which are constituent parts of the box-shaped structure 301 with a closed space are prepared (box-like body production step) as shown in FIG. 18 and FIG. 24. The box-like body 310 is a structure provided with a bottom wall, side walls and an upper open portion. A flange 311 for bonding is provided in the open portion. In this embodiment, the bottom wall and the side walls formed by precured a carbon fiber reinforced polymer composite which uses an epoxy resin as its parent material are bonded by a bonding adhesive so as to form the box-like body 310. Incidentally, the box-like body 310 may be molded integrally in an RTM method or the like.

An access hole 312 is provided in one side wall of the box-like body 310 as shown in FIG. 18. This access hole 312 is provided for inspecting the inside of the closed space after the box-shaped structure 301 is completed. The access hole 312 is made smaller than the upper open portion. In addition, the access hole 312 fixes an attachment portion 331 of a pressure bag 330 which will be described later, while the access hole 312 is also used as a access hole for discharging this pressure bag 330 and silicon rubber beads (elastic bodies) 340.

There is no particular limitation on the position where the access hole 312 is provided so long as the access hole 312 can fulfill the functions. In this embodiment, the access hole 312 is located substantially at the center of one side wall of the box-like body 310. In addition, the shape and size of the access hole 312 are set correspondingly to the shape and size of the attachment portion 331 of the pressure bag 330. As will be described later, the access hole 312 may be shaped to have a diameter as large as the outer diameter of a metal attachment constituting the attachment portion 331 of the pressure bag 330.

Figure 19:
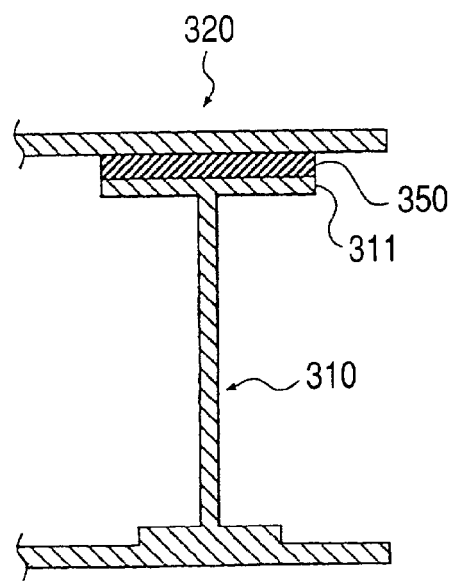
FIG. 19 is a sectional view taken on XIX—XIX line in FIG. 18, showing the state where the skin has been disposed on the box-like body through a thermosetting bonding adhesive.

The skin 320 is disposed on the flange 311 of the box-like body 310 through a bonding adhesive 350 in a closed space formation step which will be described later. The skin 320 forms a closed space in cooperation of the box-like body 310. As the skin 320 in this embodiment, there is adopted a plate-like body formed by a precured carbon fiber reinforced polymer composite which uses an epoxy resin as its parent material. A sectional view of the state where the skin 320 has been built on the flange 311 of the box-like body 310 through the bonding adhesive 350 is shown in FIG. 19.

Next, the pressure bag 330 to be fixed to the access hole 312 of the box-like body 310 is prepared (pressure bag preparation step). This pressure bag 330 is constituted by an attachment portion 331 made of a metal attachment, and a bag body portion 332 made of a silicon rubber bag body. The pressure bag 330 has a function of applying pressing force using the atmospheric pressure to the interior of the box-shaped structure 301 in an evacuation step which will be described later.

Figure 20A:
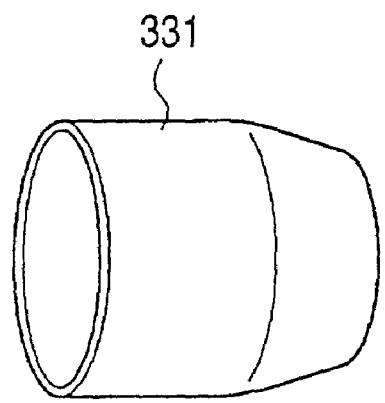
FIGS. 20A and 20B show constituent parts of a pressure bag for use in the manufacturing method according to the embodiment of the present invention, FIG. 20A being a perspective view of a metal attachment forming an attachment portion of the pressure bag, FIG. 20B being a perspective view of a silicon rubber bag body forming a bag body portion of the pressure bag.
Figure 20B:
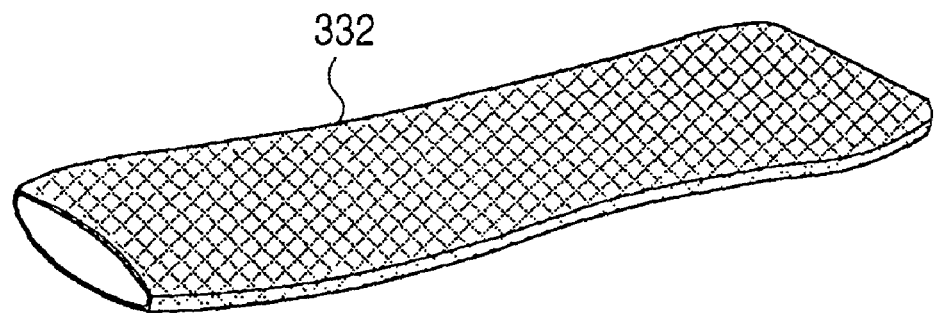

Description will be made on the procedure of preparing the pressure bag 330 with reference to FIGS. 20A and 20B and FIGS. 21A and 21B. FIGS. 20A and 20B are perspective views showing constituent parts of the pressure bag 330. FIG. 20A shows the metal attachment forming the attachment portion 331 of the pressure bag 330, and FIG. 20B shows the silicon rubber bag body forming the bag body portion 332 of the pressure bag 330.

The metal attachment has a substantially cylindrical shape as shown in FIG. 20A. An end portion of the metal attachment on the side where the metal attachment is inserted into the access hole 312 is subjected to tapering. This metal attachment can be made of various metals such as iron, aluminum, and copper. On the other hand, the silicon rubber bag body shown in FIG. 20B is made stretchable in accordance with the difference between the vacuum pressure and the atmospheric pressure. "SMC400" (trade name, made by D. Aircraft Products Inc.) expandable to about 800% is adopted in this embodiment.

Figure 21A:
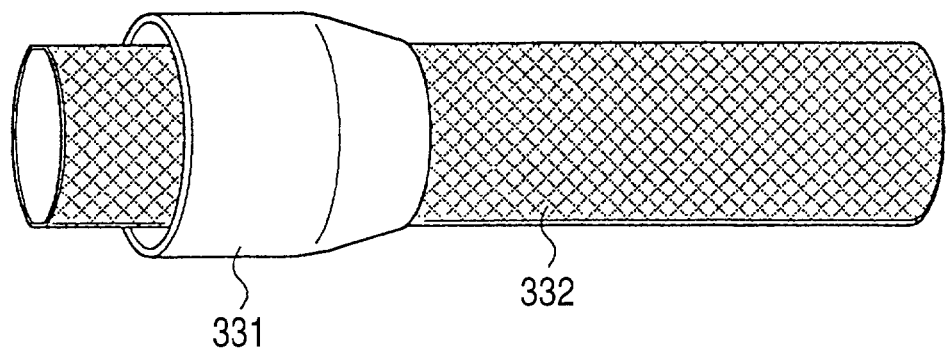
FIGS. 21A and 21B are views for explaining the procedure of preparing the pressure bag for use in the manufacturing method according to the embodiment of the present invention, FIG. 21A being a perspective view showing the state where the attachment portion of the silicon rubber bag body has been inserted into a tapered end portion of the metal attachment so as to protrude from the opposite end portion of the metal attachment, FIG. 21B being a perspective view showing the state where the attachment portion of the silicon rubber bag body has been folded and fixed onto the metal attachment.
Figure 21B:
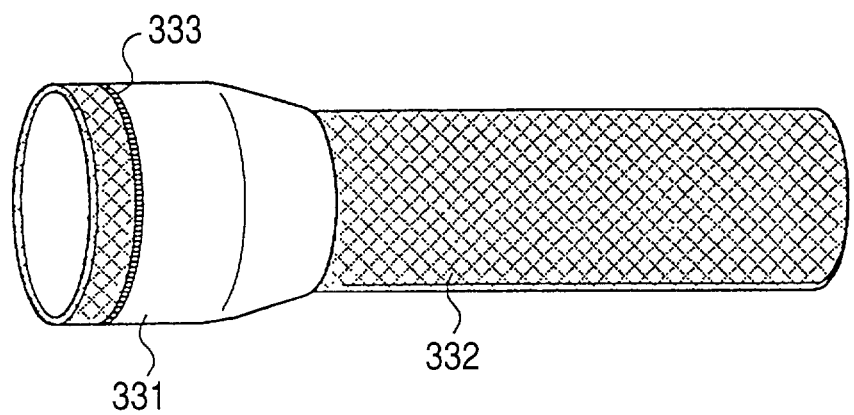

FIGS. 21A and 21B show the procedure of assembling the pressure bag 330 out of the constituent parts (metal attachment and silicon rubber bag body) of the pressure bag 330 shown in FIGS. 20A and 20B. When the pressure bag 330 is formed, an attachment portion of the silicon rubber bag body is inserted into the tapered end portion of the metal attachment so as to protrude from the opposite end portion of the metal attachment (see FIG. 21A). This protruding portion is folded to cover the surface of the metal attachment, and the covering portion is fixed by a tape 333 (see FIG. 21B).

Figure 22:
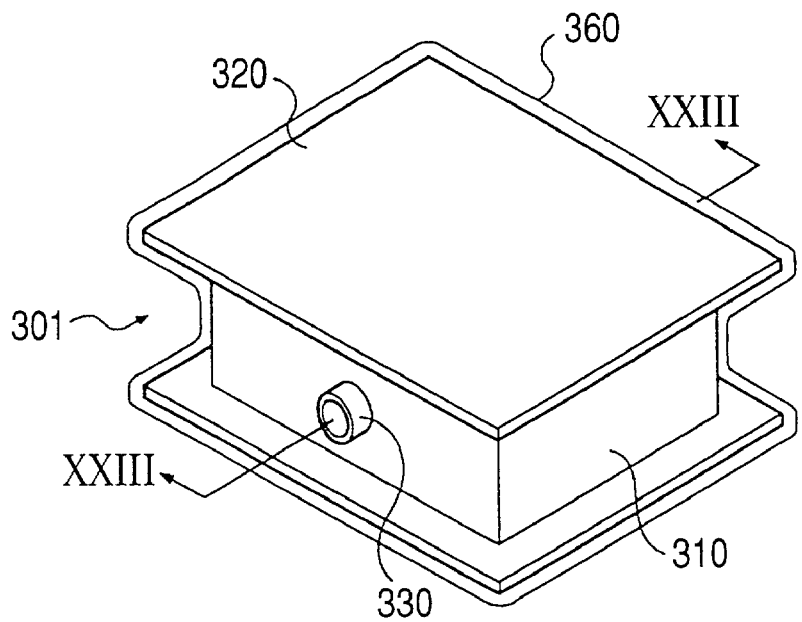
FIG. 22 is a perspective view showing the state where a box-shaped structure has been temporarily formed by dispersing the pressure bag in the box-like body shown in FIG. 18, charging silicon rubber beads into the box-like body and disposing the skin on a flange of the box-like body, and the box-shaped structure has been covered with a vacuum bag.
Figure 23:
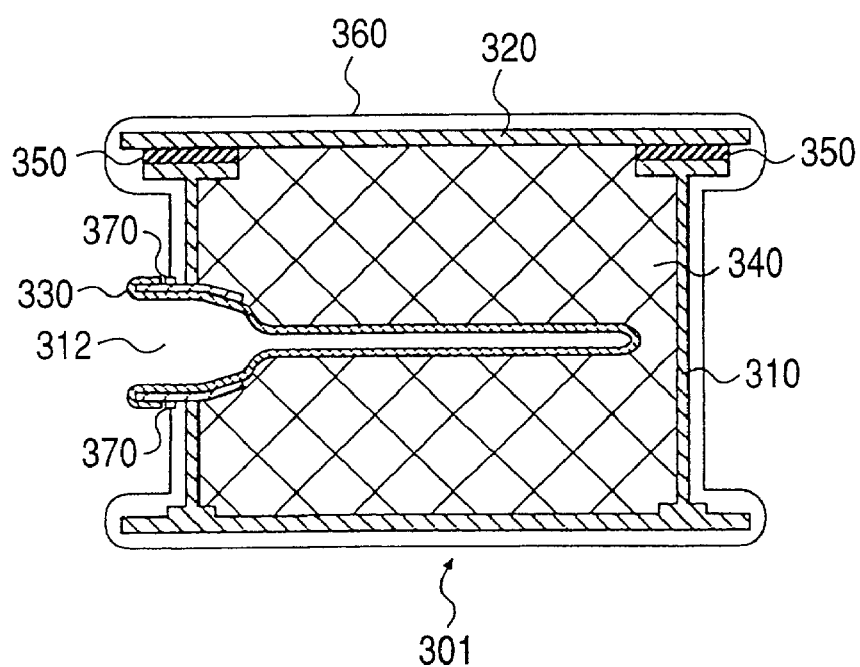
FIG. 23 is a sectional view taken on line XXIII—XXIII in FIG. 22.

Next, the pressure bag 330 is fixed to the access hole 312 of the box-like body 310 (pressure bag disposition step) When the pressure bag 330 is fixed to the access hole 312 of the box-like body 310, the bag body portion 332 of the pressure bag 330 is received in the box-like body 310 while the attachment portion 331 of the pressure bag 330 is fixed into the access hole 312 in the state where the attachment portion 331 is opened to the outside of the box-like body 310 (see FIGS. 22 and 23).

Next, the silicon rubber beads 340 which are elastic bodies are charged into the box-like body 310 (elastic body charging step: see FIG. 23). The silicon rubber beads 340 are elastic bodies being superior in flexibility, thermal expansivity and heat resistance. According to a free expansion of the pressure bag 330, the atmospheric pressure or the pressing force is transmitted to the inner surface of the box-liked 310 uniformly through the silicon beads. In this embodiment, silicon rubber beads each having a diameter of 4 mm and a heat-resistant temperature of 250° C. are adopted as the silicon rubber beads 340. Incidentally, there is no limitation on the filling rate or pressing rate of the silicon rubber beads 340 into or inside box-like body 310 so long as the silicon rubber beads 340 can fulfill the function.

Next, the skin 320 is assembled on the flange 311 of the box-like body 310 filled with the silicon rubber beads 340, through the thermosetting bonding adhesive 350, so as to form a box-shaped structure 301 with a closed space temporarily (closed space formation step: see FIGS. 19, 22 and 23). Examples of the thermosetting bonding adhesive 350 include an epoxy-based bonding adhesive, a urea-resin-based bonding adhesive, a melamine-resin-based bonding adhesive, and a phenolic-resin-based bonding adhesive. In this embodiment, an epoxy-based bonding adhesive hardening at 180° C. is adopted.

Next, the box-shaped structure 301 is covered with a vacuum bag 360, except the attachment portion 331 of the pressure bag 330 which has been fixed to the access hole 312 and opened to the outside of the box-like body 310 (covering step: see FIGS. 22 and 23). At this time, the gap between the attachment portion 331 of the pressure bag 330 and the vacuum bag 360 is sealed up with a sealer 370 in order to secure air tightness in the portion surrounded by the box-shaped structure 301 and the vacuum bag 360 (see FIG. 23). It is preferable that the vacuum bag 360 has heat resistance high enough to withstand heating in a heating step which will be described later, and is superior in flexibility. The vacuum bag 360 maybe made of a nylon film, silicon rubber, fluropolymer rubber, etc.

Next, the air is evacuated from the portion surrounded by the box-shaped structure 301 and the vacuum bag 360 and from the closed space of the box-shaped structure 301 (evacuation step). At this time, a related-art method using a vacuum pump may be adopted. That is, an evacuation hole is provided in the vacuum bag 360, and this evacuation hole and the vacuum pump are connected through an evacuation pipe. The air can be evacuated from the portion surrounded by the box-shaped structure 301 and the vacuum bag 360 and from the closed space of the box-shaped structure 301 by the suction operation of the vacuum pump.

In this evacuation step, small holes for removing the air are provided in appropriate places of the box-like body 310 in order to evacuate the air from the closed space of the box-shaped structure 301. The number and size of the small holes for removing the air can be determined suitably within a range not to impede the evacuation of the air from the closed space of the box-shaped structure 301. Incidentally, it is preferable that the small holes for removing the air are provided in places having no influence on the structural strength of the box-like body 310.

Since the air is evacuated from the portion surrounded by the box-shaped structure 301 and the vacuum bag 360 in this evacuation step, uniform pressing force using the atmospheric pressure acts on the exterior of the box-shaped structure 301 through the vacuum bag 360. In addition, since the air is evacuated from the closed space of the box-shaped structure 301 in this evacuation step, uniform pressing force using the atmospheric pressure acts on the interior of the box-shaped structure 301 through the pressure bag 330 and the silicon rubber beads 340.

FIG. 24 shows the state where the pressure bag 330 has been expanded by the atmospheric pressure applied to the pressure bag 330 in this evacuation step. When the pressure in the closed space approaches vacuum pressure in response to the evacuation of the air from the closed space of the box-shaped structure 301 in the evacuation step, pressing force using the atmospheric pressure fed to the pressure bad 30 through the opened attachment portion 331 acts on the interior of the pressure bag 330. The bag body portion 332 of the pressure bag 330 is formed out of a stretchable silicon rubber bag body as described previously. Thus, as shown in FIG. 24, the bag body portion 332 expands easily due to the difference between the vacuum pressure and the atmospheric pressure so that the pressing force based on the expansion of the bag body portion 332 of the pressure bag 330 is transmitted through the silicon rubber beads 340 so as to act on the interior of the box-shaped structure 301.

In addition, the silicon rubber beads 340 can be fluidized freely in accordance with the expansion of the pressure bag 330 and the interior shape of the box-shaped structure 301, and is superior in flexibility. Accordingly, the silicon rubber beads 340 can apply the pressing force based on the expansion of the pressure bag 330 uniformly to the inner surface of the box-shaped structure 301. As a result, the pressing force can be applied also to the lower surface of the flange 311 of the box-like body 310 uniformly.

Here, the pressing force acting on the lower surface of the flange 311 of the box-like body 310 through the pressure bag 330 and the silicon rubber beads 340 is caused by the atmospheric pressure, and the pressing force acting on the upper surface of the circumferential edge portion of the skin 320 through the vacuum bag 360 is also caused by the atmospheric pressure. Accordingly, uniform bonding pressure can be applied to the upper and lower surfaces of the bonding portion, that is, the lower surface of the flange 311 of the box-like body 310 and the upper surface of the circumferential edge portion of the skin 320.

Figure 25A:
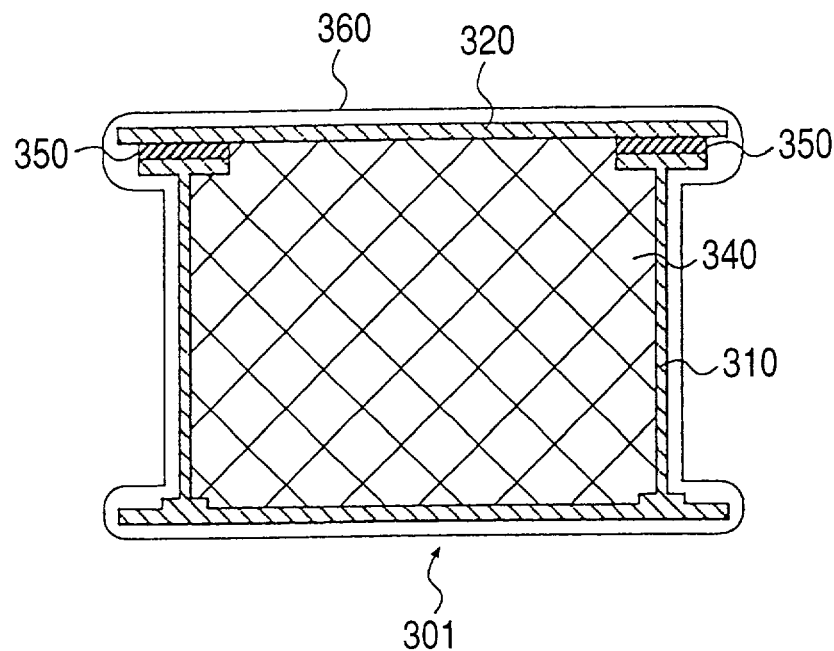
FIGS. 25A and 25B shows an example in which the pressure bag is not adopted in the evacuation step of the manufacturing method according to the embodiment of the present invention, FIG. 25A being a sectional view showing the state where a box-shaped structure has been temporarily formed by charging only silicon rubber beads into the box-like body shown in FIG. 18, and disposing the skin on the flange of the box-like body, and the box-shaped structure has been covered with the vacuum bag, FIG. 25B being a sectional view showing the state where pressing force using the atmospheric pressure has been applied to the box-shaped structure shown in FIG. 25A in the evacuation step in the case where the amount of beads has been insufficient.
Figure 25B:
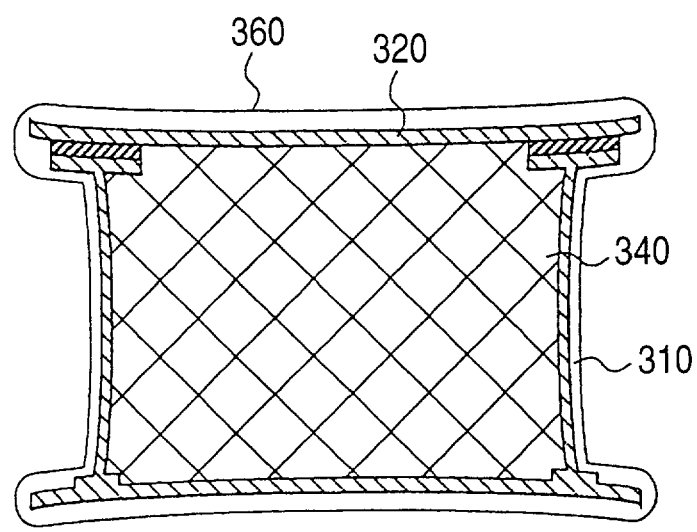
Figure 26:
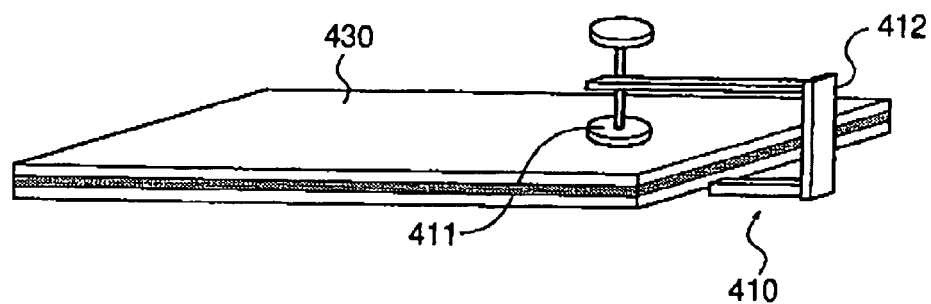
FIG. 26 is a perspective view for explaining a related-art bonding method using a C-clamp.
Figure 27:
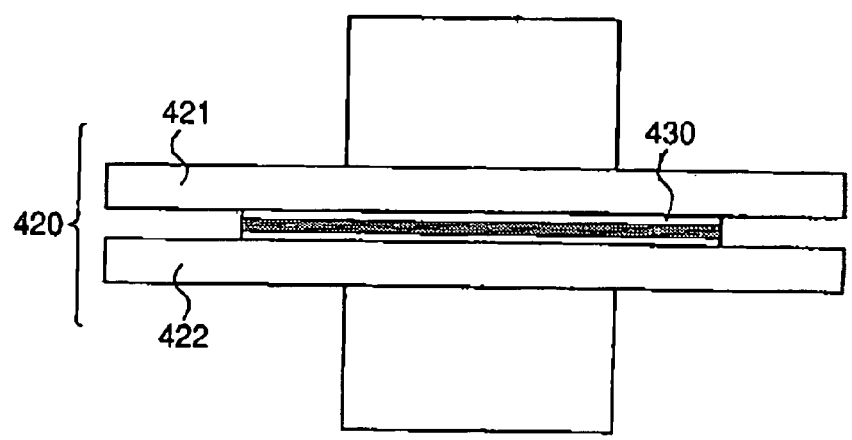
FIG. 27 is aside view for explaining a related-art bonding method using a pressing machine.
Figure 28:
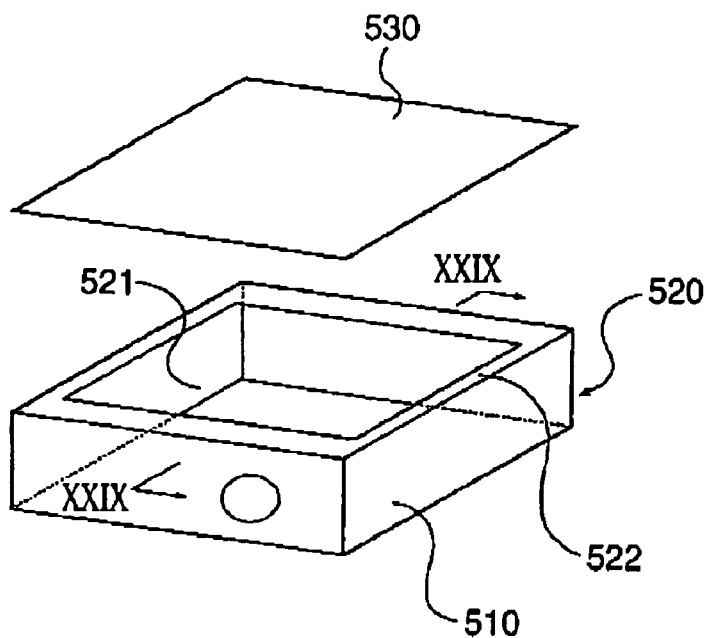
FIG. 28 is a perspective view showing a box-like body and a plate-like body used in a related-art method for manufacturing a structure with a closed space.
Figure 29:
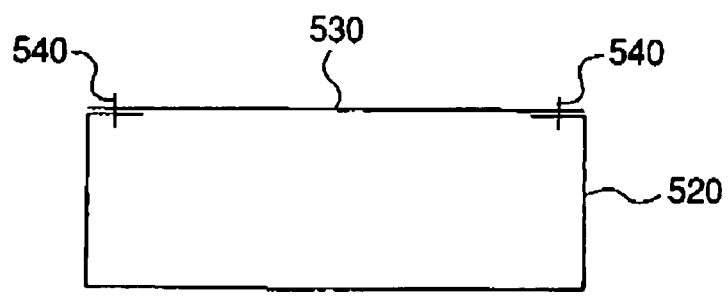
FIG. 29 is a sectional view taken on line XXIX—XXIX in FIG. 28, showing the state where the plate-like body has been fixed to the box-like body in FIG. 28 by coupling with rivets.
Figure 30:
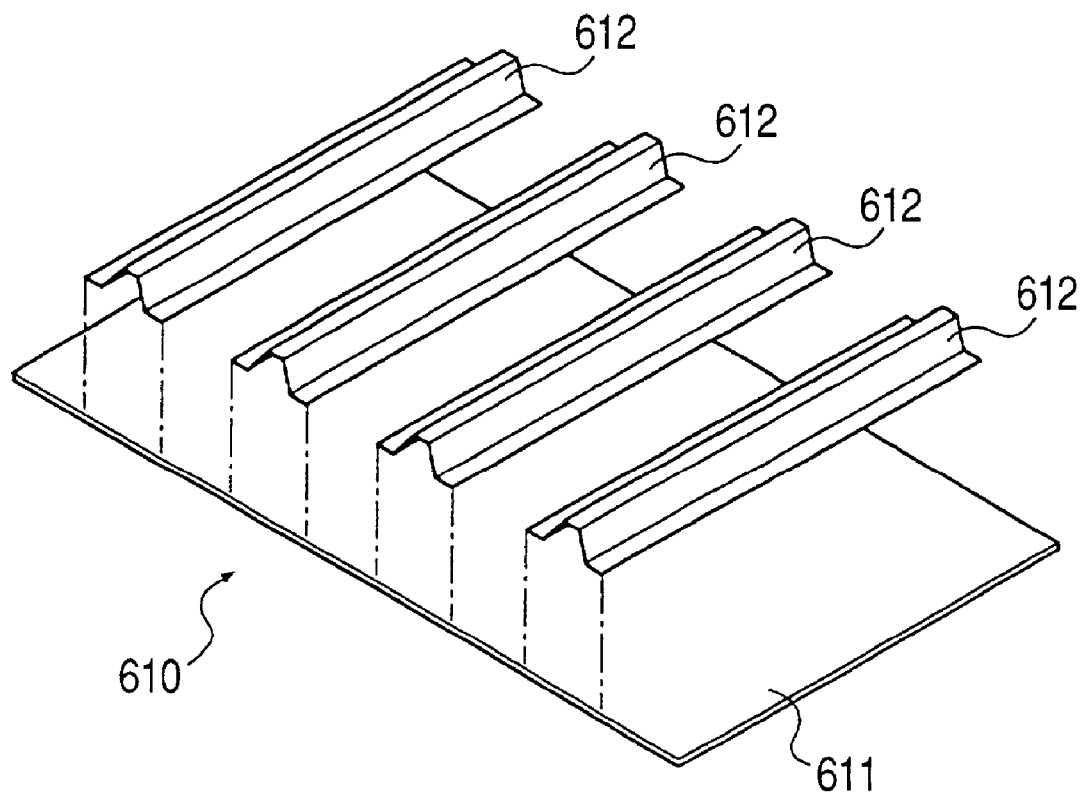
FIG. 30 is an explanatory view for explaining a related-art method for manufacturing a stiffened panel with stiffeners each having a hat shape in section.
Figure 31A:
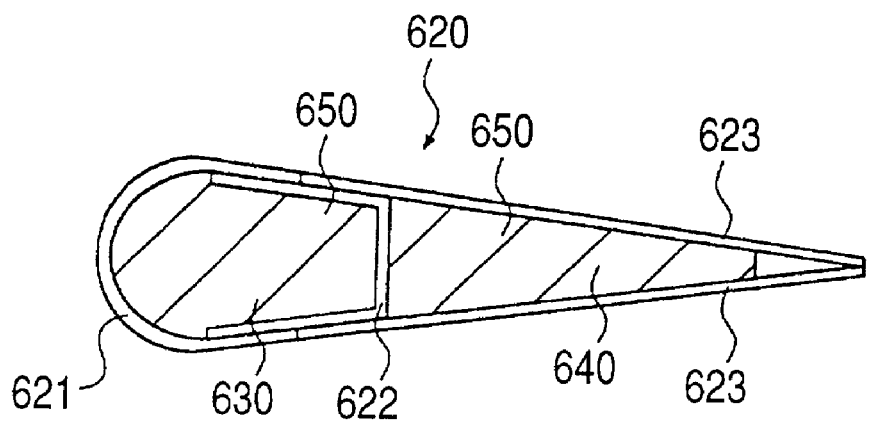
FIGS. 31A and 31B are explanatory views for explaining related-art methods for manufacturing a movable wing, FIG. 31A showing the case where a bagging film has been inserted into a hollow portion, FIG. 31B showing the case where a mandrel made of metal or hard rubber has been inserted into a hollow portion.
Figure 31B:
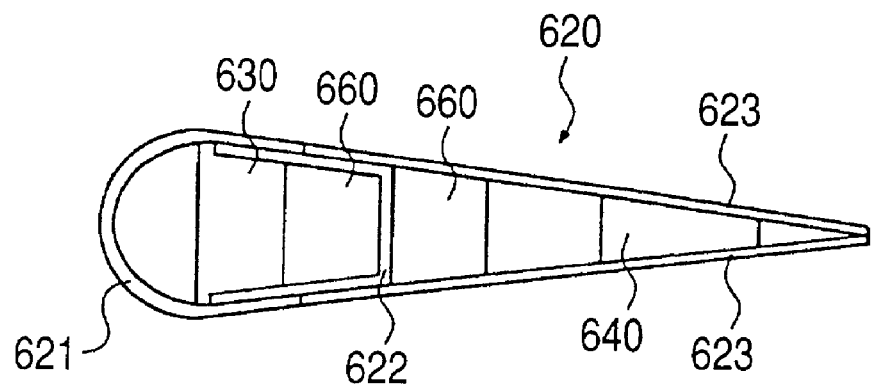

On the other hand, FIGS. 25A and 25B show an example of the case where introduction of the atmospheric pressure by use of the pressure bag 330 is not performed. FIG. 25A shows the state where only the silicon rubber beads 340 have been charged into the box-like body 310, the skin 320 has been disposed on the flange 311 of the box-like body 310 with the thermosetting bonding adhesive 350, and the box-shaped structure 301 has been covered with the vacuum bag 360. On the other hand, FIG. 25B shows the state where the air in the state of FIG. 25A has been evacuated from the portion surrounded by the box-shaped structure 301 and the vacuum bag 360 and from the closed space of the box-shaped structure 301.

In this example, pressing force caused by the atmospheric pressure acts on the exterior of the box-shaped structure 301 in response to the evacuation of the air from the portion surrounded by the box-shaped structure 301 and the vacuum bag 360 and the air from the closed space of the box-shaped structure 301. On the other hand, reaction force due to the silicon rubber beads 340 charged into the box-shaped structure 301 acts on the interior of the box-shaped structure 301. This reaction force is not always balanced with the pressing force caused by the atmospheric pressure and acting on the exterior of the box-shaped structure 301. Therefore, if the amount of the beads 340 is insufficient, the side walls of the box-like body 310 and the skin 320 constituting the box-shaped structure 301 may be bent inward as shown in FIG. 25B, so that a desired product shape may not be obtained.

Further, consider that the silicon rubber beads 340 charged into the box-shaped structure 301 are heated to expand so that pressing force caused by the expansion is applied to the interior of the box-shaped structure 301. When the pressing force caused by the expansion is thus intended to be balanced with the pressing force caused by the atmospheric pressure and acting on the exterior of the box-shaped structure 301, the filling rate and the initial pressing rate of the silicon rubber beads 340 have to be established in extremely narrower ranges than those in the case where the pressure bag 330 is adopted.

By contrast, in the manufacturing method according to this embodiment, the pressure bag 330 is adopted to introduce the atmospheric pressure into the box-shaped structure 301 so that the problem occurring in the example of FIGS. 25A and 25B can be solved extremely simply.

The box-shaped structure 301 is heated at 180° C, in an oven or the like for 120 to 150 minutes in the state where the pressing force based on the evacuation step is applied to the box-shaped structure 301, so that the thermosetting bonding adhesive 350 is hardened (hardening step). In addition to the evacuation step described previously, when the silicon rubber beads 340 are heated in this hardening step so as to be expanded to be fluidized and deformed, the silicon rubber beads 340 enter narrow gaps inside the box-like body 310 so that bonding pressure can be applied to the fine portions of the box-like body 310. Incidentally, since the silicon rubber beads 340 are superior in heat resistance, there is no fear that the silicon rubber beads 340 are deteriorated by heating at 180° C. in the heating step.

In addition, when heating in the hardening step is carried out in the state where the pressing force based on the evacuation step is applied to the upper and lower surfaces of the bonding portion (that is, the lower surface of the flange 311 of the box-like body 310 and the upper surface of the circumferential edge portion of the skin 320), the thermosetting bonding adhesive 350 disposed between the flange 311 of the box-like body 310 and the circumferential edge portion of the skin 320 undergoes hardening reaction against the pressing force and the heating. As a result, the skin 320 is bonded firmly with the flange 311 of the box-like body 310.

Next, after the box-shaped structure 301 is left alone till it is cooled to room temperature, the vacuum bag 360 covering the box-shaped structure 301 is removed, and the pressure bag 330 and the silicon rubber beads 340 are discharged from the access hole 312 of the box-like body 310 forming the box-shaped structure 301 (discharge step). After that, the access hole 312 is closed. Thus, the manufacture of the box-shaped structure 301 is terminated.

According to the manufacturing method according to this embodiment, the pressure bag 330 having the attachment portion 331 and the bag body portion 332 being superior in stretchability is prepared. The bag body portion 332 of the pressure bag 330 is received inside the box-like body 310 while the attachment portion 331 of the pressure bag 330 is fixed into the access hole 312 in the state where the attachment portion 331 is opened to the outside of the box-like body 310. The silicon rubber beads 340 are charged into the box-like body 310. The skin 320 is disposed on the flange 311 of the box-like body 310 filled with the silicon rubber beads 340, with the thermosetting bonding adhesive 350, so as to form the box-shaped structure 301 temporarily. The box-shaped structure 301 is covered with the vacuum bag 360, except the attachment portion 331 of the pressure bag 330 which is fixed to the access hole 312 and which is opened to the outside of the box-like body 310. The air is evacuated from the portion surrounded by the box-shaped structure 301 and the vacuum bag 360 and from the closed space. Thus, pressing force using the atmospheric pressure can be applied to the interior of the box-shaped structure 301 through the pressure bag 330 and the silicon rubber beads 340 while pressing force using the atmospheric pressure can be applied to the exterior of the box-shaped structure 301 through the vacuum bag 360.

Accordingly, the pressing force applied to the interior of the box-shaped structure 301 can be extremely easily balanced with the pressing force applied to the exterior of the box-shaped structure 301. Thus, uniform bonding pressure can be applied to the opposite surfaces of the bonding portion (that is, the flange 311 of the box-like body 310, and the circumferential edge portion of the skin 320 disposed on the flange 311 with the bonding adhesive 350) extremely easily.

Accordingly, unlike the case where only the silicon rubber beads 340 are used as pressure media (see FIGS. 25A and 25B), it is not necessary to establish the filling amount or the initial pressing rate of the pressure media precisely. It is therefore possible to reduce the time and labor required for the bonding work. As a result, the working efficiency can be improved on a large scale. In addition, pressing forces (pressing forces using the atmospheric pressure) acting respectively on the interior and exterior of the skin 320 and the box-like body 310 are always balanced with each other, while the skin 320 and the box-like body 310 are constituent parts of the box-shaped structure 301. Accordingly, there is no fear that these constituent parts are bent so that a high quality product can be obtained.

In addition, according to the manufacturing method of this embodiment, when the pressing force using the atmospheric pressure is applied to the interior of the box-shaped structure 301 through the pressure bag 330 and the silicon rubber beads 340, the silicon rubber beads 340 are deformed correspondingly to the shape of the flange 311 of the box-like body 310 so that bonding pressure can be applied uniformly all over the flange 311. Accordingly, a stable bonding effect can be obtained. Also from this point of view, higher product quality can be achieved.

Further, according to the manufacturing method of this embodiment, the silicon rubber beads 340 being superior in flexibility and thermal expansivity are adopted as elastic bodies. Accordingly, when the silicon rubber beads 340 are expanded in the evacuation step and the hardening step so as to be fluidized and deformed, the silicon rubber beads 340 enter narrow gaps so that bonding pressure can be applied to the fine portions of the box-like body 310. Thus, a high bonding effect can be obtained.

Furthermore, according to the manufacturing method of this embodiment, the silicon rubber beads 340 being superior in heat resistance are adopted as elastic bodies. Accordingly, there is no fear that the elastic bodies are deteriorated even if the elastic bodies are heated in the hardening step. As a result, even when the bonding adhesive 350 to be hardened at a comparatively high temperature (180° C.) is used as in this embodiment, the elastic bodies can withstand the curing temperature sufficiently. Thus, the bonding adhesive can be hardened surely.

Next, test samples cut out of the box-shaped structure 301 manufactured in the manufacturing method according to this embodiment (hereinafter referred to as "test samples according to the inventive method") and test samples for comparison were prepared. Then, a compression shear test was carried out on each of the test samples. The results of the test will be described with reference to Table 1.

<Preparation of Test Samples>

First, three test samples according to the inventive method each measuring 12.69 mm in width and 6.40 mm in bonding portion length (hereinafter referred to as "lap length") were prepared by cutting the test samples out of a box-shaped structure 301 manufactured in the manufacturing method according to this embodiment. The bonding portion of each of the test samples according to the inventive method was obtained by application of pressing force caused by the atmospheric pressure as described in the procedure.

Next, four kinds of test samples for comparison having substantially the same width and substantially the same lap length as those of the test samples according to the inventive method were prepared. In the four kinds of test samples for comparison, the bonding pressure was set to be 0 kPa, 49 kPa, 98 kPa and 314 kPa, respectively. Incidentally, also as the test samples for comparison, three were prepared for each kind in the same manner as the test samples according to the inventive method.

<Compression Shear Test>

Succeedingly, a compression load was applied to each of the test samples according to the inventive method by a universal testing machine so that shear force was applied to the bonding portion. Then, the load (breaking load) with which the test sample according to the inventive method was broken was measured. In addition, shear stress at the time of breaking was obtained by dividing this breaking load by the area of the bonding portion of the test sample according to the inventive method (that is, the area ($8.12 \times 10^{-5}$ m$^2$) obtained by multiplying the lap length (6.40 mm) of the test sample by the width (12.69 mm) thereof). Further, the average values of the breaking load and the shear stress were obtained.

Upon the four kinds of test samples for comparison, measurement of the breaking load and calculation of shear stress were performed in the same procedure, and average values of the breaking load and the shear stress were obtained.

Table 2 shows the breaking loads, the shear stresses, and the average values of the breaking loads and the shear stresses, obtained in the test samples according to the inventive method and the test samples for comparison by the compression shear test.

TABLE 2

| Name | test sample bonding pressure (kPa) | width (mm) | lap length (mm) | breaking load (N) | shear stress (MPa) individual value | average |
|---|---|---|---|---|---|---|
| test sample according to inventive method | atmospheric pressure | 12.69 | 6.40 | 4280 | 52.7 | 52.3 |
|  |  | 12.69 | 6.39 | 4280 | 52.8 |  |
|  |  | 12.69 | 6.40 | 4160 | 51.3 |  |
| test sample for comparison | 0 | 12.68 | 6.45 | 2519 | 30.8 | 38.6 |
|  |  | 12.69 | 6.43 | 3675 | 45.0 |  |
|  |  | 12.68 | 6.39 | 3234 | 39.9 |  |
|  | 49 | 12.68 | 6.43 | 3597 | 44.1 | 42.9 |
|  |  | 12.68 | 6.42 | 3048 | 37.4 |  |
|  |  | 12.69 | 6.43 | 3842 | 47.1 |  |
|  | 98 | 12.68 | 6.37 | 4322 | 53.5 | 51.5 |
|  |  | 12.67 | 6.38 | 4038 | 50.0 |  |
|  |  | 12.68 | 6.44 | 4175 | 51.1 |  |
|  | 314 | 12.68 | 6.42 | 4439 | 54.5 | 57.7 |
|  |  | 12.68 | 6.40 | 4831 | 59.5 |  |
|  |  | 12.67 | 6.41 | 4802 | 59.1 |  |

As shown in Table 2, the average value of the shear stress in the test samples according to the inventive method is 52.3 MPa, showing a value substantially equal to the average value of the shear stress (51.5 MPa) of the test samples for comparison in which bonding was performed with the bonding pressure of 98 kPa. Thus, it is proved that the test samples according to the inventive method have sufficient bonding strength. This test result demonstrates that the test samples according to the inventive method are bonded by the application of the pressing force caused by the atmospheric pressure (about 100 kPa).

Incidentally, when the bonding adhesive is an epoxy-based bonding adhesive or a rubber-based bonding adhesive, application of pressure not lower than contact pressure (6.9 kPa to 13.7 kPa) is considered as a pressing condition. However, since bubbles are usually mixed into the bonding adhesive layer, it is preferable that bonding pressure not lower than pressure (34 kPa) five times as high as the contact pressure is applied for elimination of such bubbles. Since the test samples according to the inventive method are bonded by the application of pressing force caused by the atmospheric pressure (about 100 kPa), such bubbles can be eliminated sufficiently.

Incidentally, although the silicon rubber beads 340 were adopted as elastic bodies in the embodiment, the elastic body (bodies) is not limited to those. For example, a plurality of spherical bodies made of a material which has no thermal expansivity but is superior in elasticity, oozy slurry (slime) formed out of fluid and insoluble solid particles, and so on, may be adopted as the elastic body (bodies).

Further, in the embodiment, since the pressure bag 330 is adopted, the pressing force applied to the interior of the box-shaped structure 301 can be easily balanced with the pressing force applied to the exterior of the box-shaped structure 301 in the evacuation step. Thus, also when the box-shaped structure 301 is pressed in an autoclave, the pressing force applied to the interior of the box-shaped structure 301 can be easily balanced with the pressing force applied to the exterior of the box-shaped structure 301 in the same manner. Accordingly, the embodiment can be applied also to a manufacturing process using an autoclave.

In addition, in the embodiment, in the evacuation step, the pressing force using the atmospheric pressure is applied to the interior of the box-shaped structure 301 through the pressure bag 330 and the silicon rubber beads 340, while the pressing force using the atmospheric pressure is applied to the exterior of the box-shaped structure 301 through the vacuum bag 360. At this time, since it takes time to fluidize or deform the beads 340 or frictional force acts among the beads 340, the side walls of the box-like body 310 or the skin 320 may be bent by the pressing force acting on the interior or the exterior of the box-shaped structure 301.

Particularly, when the side walls of the box-like body 310 or the skin 320 is formed from a low-rigidity material, when the side walls of the box-like body 310 or the skin 320 is comparatively thin, or when the distance between the side walls supporting the skin 320 is comparatively long, the side walls of the box-like body 310 or the skin 320 is easy to bend. Cowl plates may be disposed to reinforce the side walls of such a box-like body 310 or such a skin 320 and prevent them from bending.

In addition, in the tenth embodiment, description was made on the example in which the box-shaped structure 301 made of a composite material was manufactured by use of a thermosetting bonding adhesive. However, a box-shaped structure made of a composite material may be manufactured by use of a room-temperature setting bonding adhesive. Further, the manufacturing method according to the embodiment may be applied also to the manufacture of a box-shaped structure made of metal.

According to the first and second aspects of the present invention, pressure is applied to the adherends through the spherical bodies made of silicon rubber, so that uniform pressure can be applied to the adherends without using an autoclave which has been used in the related art. Thus, the cost for constructing the equipment or the operation cost does not increase, so that the cost effectiveness is extremely excellent.

In addition, according to the first and second aspects of the present invention, pressure is applied to the adherends through the spherical bodies made of silicon rubber so that uniform pressure can be applied all over the adherends. Accordingly, there is no fear that the bonding adhesive is thinned locally due to the pressure applied to only a part of the adherends. As a result, a sufficient bonding effect can be obtained.

Further, according to the first and second aspects of the present invention, pressure is applied to the adherends through the spherical bodies made of silicon rubber. Accordingly, the magnitude of the pressure (pressurizing value) applied to the adherends can be established desirably by suitably changing the diameter, the hardness, the pressing rate, and so on, of the spherical bodies made of silicon rubber. Thus, an appropriate pressurizing value can be set in accordance with the adherends or the kind of the bonding adhesive.

Furthermore, according to the second aspect of the present invention, pressure is applied to the adherends through the spherical bodies made of silicon rubber. Accordingly, even if the bonded surfaces of the adherends have curved shapes, the spherical bodies made of silicon rubber flows and are deformed to match the curved shapes, so that uniform pressure can be applied to the adherends. Thus, it is not necessary to manufacture jigs in accordance with the bonding curved surfaces of the adherends, and there is no fear that the cost increases.

According to the third aspect of the present invention, not only is the advantage of the present invention described in the second aspect of the invention, but there is also provided a step in which the spherical bodies made of silicon rubber are heated to expand so as to apply pressure to the adherends. Thus, pressure can be applied to the adherends surely. In addition, the magnitude of the pressure (pressurizing value) applied to the adherends can be established more accurately in accordance with the pressing-rate of the spherical bodies made of silicon rubber. Thus, an optimal pressurizing value can be set in accordance with the adherends or the kind of the bonding adhesive so that bonding can be carried out extremely accurately.

According to the fourth aspect of the present invention, in addition to the advantage of the present invention described in the third aspect of the present invention, the compressive deformation rate (for establishing the pressurizing value) is measured in the state where the spherical bodies made of silicon rubber are charged and compressed to a desired height in a vessel having a constant sectional area. Accordingly, the pressurizing value can be established extremely easily.

According to the fifth aspect of the present invention, a structure with a closed space can be manufactured integrally by bonding by use of a flexible mandrel without going through a rivet coupling step. Accordingly, complicated works such as the work of forming rivet holes, the work of fastening rivets, and so on, can be omitted, so that the labor for manufacturing can be reduced on a large scale.

In addition, according to the sixth aspect of the present invention, a structure with a closed space can be manufactured not by use of any metal mandrel but by use of a flexible mandrel. Accordingly, it is not necessary to prepare a large number of kinds of metal mandrels matching the shape of the structure to be manufactured. Thus, the manufacturing cost can be reduced on a large scale.

According to the seventh aspect of the present invention, a structure with a closed space can be manufactured not by use of any metal mandrel but by use of a flexible mandrel, and this flexible mandrel can be discharged from the access hole easily after the termination of the manufacture, not to mention the advantage of the present invention described in the sixth aspect of the present invetion. Accordingly, the demolding work which was difficult in the related art becomes extremely easy. Thus, the manufacturing cycle can be accelerated.

In addition, according to the seventh aspect of the present invention, in addition to the effect and advantage of the present invention described in the sixth aspect of the present invention, a structure with a closed space can be manufactured not by use of any metal mandrel but by use of a flexible mandrel, and the flexible mandrel used in this manufacturing process can be discharged from the access hole after the termination of the manufacture and reused in the next manufacturing process. Accordingly, the manufacturing cost can be reduced on a large scale.

According to the seventh and eighth aspect of the present invention, pressing force based on the expansion of the flexible mandrel in the heating step can be controlled desirably by appropriately changing the filling rate, diameter and hardness of the silicon rubber beads or by appropriately changing the mixing ratio between the silicon rubber beads and the glass beads, not to mention the advantage of the present invention described in the sixth and seventh aspect of the present invetion. Accordingly, optimal pressing force can be applied to the structure in accordance with the material or size of constituent members, the kind of the bonding adhesive, or the like, so that a higher quality structure can be manufactured.

According to the ninth aspect of the present invention, a flexible mandrel is used for supporting the stiffener material, in place of a bagging film used in the related art. This flexible mandrel can be deformed freely in accordance with the internal shape of the stiffener. Thus, uniform pressure can be applied to the skin material and the stiffener material. As a result, a composite material product with extremely high quality can be obtained.

In addition, according to the ninth aspect of the present invention, the flexible mandrel is used for supporting the stiffener material, in place of a bagging film used in the related art, and this flexible mandrel can be used repeatedly plural times. Accordingly, the manufacturing cost can be reduced on a large scale.

Further, according to the ninth aspect of the present invention, a flexible mandrel is disposed for supporting the stiffener material, in place of a metal mandrel used in the related art. This flexible mandrel can be deformed freely so that the flexible mandrel can be extracted from between the skin and the stiffener easily after molding, regardless of the internal shape of the stiffener. Accordingly, composite material stiffened panels having various shapes can be manufactured. In addition, the flexible mandrel is not required to have processing accuracy as stringent as that of the metal mandrel. Thus, the cost for manufacturing the mandrel can be suppressed. As a result, the cost for manufacturing a composite material product can be reduced. In addition, the flexible mandrel is lighter in weight than the metal mandrel, so that the flexible mandrel is extremely easy to handle. As a result, the labor for manufacturing can be reduced on a large scale.

Furthermore, according to the ninth aspect of the present invention, a flexible mandrel is disposed for supporting the stiffener material, in place of a hard rubber mandrel used in the related art. The magnitude of pressure applied to the skin material and the stiffener material can be controlled by adjusting the mixing ratio or the filling rate of silicon rubber beads or glass beads forming the flexible mandrel. As a result, a composite material product with extremely high quality can be obtained.

According to the tenth aspect of the present invention, in addition to the advantage of the present invention described in the ninth aspect of the present invention, a thermosetting resin film is disposed, heated and melted, so that the thermosetting resin is impregnated into the fiber reinforced fabric material forming the skin material and the stiffener material, and the impregnated thermosetting resin is hardened. Since the thermosetting resin film can be prepared extremely easily and easy to handle, the labor and cost for manufacturing can be further reduced.

According to the eleventh aspect of the present invention, in addition to the advantage of the present invention described in the ninth aspect of the preset invention, thermosetting resin is introduced only by vacuum pressure so as to be impregnated into the fiber reinforced fabric material as the skin material and the stiffener material, and the impregnated thermosetting resin is hardened. Since the step of applying pressure to thereby impregnate resin is omitted, the labor and cost for manufacturing can be further reduced.

According to the twelfth and thirteenth aspect of the present invention, the effect and advantage of the present invention described in the ninth aspect of the present invention can be attained sufficiently while a so-called prepreg lamination method or a so-called co-bonding method which has been heretofore employed is employed. Accordingly, an existing prepreg manufacturing apparatus, an existing autoclave, and so on, can be utilized effectively so that a higher quality composite material product can be manufactured.

According to the fourth aspect of the present invention, pressing force using the atmospheric pressure can be applied to the interior of a structure with a closed space through a pressure bag and an elastic body, while pressing force using the atmospheric pressure can be applied to the exterior of the structure with a closed space through a vacuum bag. Accordingly, the pressing force applied to the interior of the structure with a closed space can be extremely easily balanced with the pressing force applied to the exterior of the structure with a closed space. Thus, uniform bonding pressure can be applied to the opposite surfaces of the bonding portion easily.

Accordingly, unlike the case in which only silicon rubber beads are used as pressure media, the filling amount or the initial pressing rate of the pressure media does not have to be established precisely so that the time and labor required for the bonding work can be reduced. As a result, the working efficiency can be improved on a large scale.

In addition, according to the fourteenth aspect of the present invention, pressing forces (pressing forces using the atmospheric pressure) acting respectively on the interior and exterior of the skin and the box-like body are always balanced with each other while the skin and the box-like body are constituent parts of the structure with the closed space. Accordingly, there is no fear that these constituent parts are bent so that higher product quality can be achieved.

In addition, according to the fourteenth aspect of the present invention, when the pressing force using the atmospheric pressure is applied to the interior of the structure with the closed space through the pressure bag and the elastic body, bonding pressure can be applied uniformly all over the inner surface of the box-like body because the elastic body is deformed correspondingly to the inner surface shape of the box-like body. Accordingly, the bonding pressure can be applied also to the bonding portion uniformly so that a stable bonding effect can be obtained. Also from this point of view, higher product quality can be achieved.

Further, according to the related-art method using only a pressure bag as a pressure medium, a special jig is required because it is necessary to mold the pressure bag correspondingly the inner surface shape of a box-like body. By contrast, according to the present invention, such a special jig is not required so that there is no fear that the cost for manufacturing increases. In addition, even when the box-like body has a complicated inner surface shape, the elastic body is deformed correspondingly to the inner surface shape of the box-like body. Thus, it is not necessary to mold a pressure bag having a complicated shape, and the labor to bring the pressure bag into tight contact with the inner surface shape can be saved.

According to the fifteenth aspect of the present invention, silicon rubber beads being superior in flexibility and thermal expansivity are used as the main constituent components of the elastic body. Accordingly, for example, when small-diameter silicon rubber beads are heated in a hardening step so as to be fluidized and deformed, the elastic body can enter narrow gaps so that bonding pressure can be applied to fine portions of the box-like body. As a result, further higher product quality can be achieved.

In addition, according to the fifteenth aspect of the present invention, since silicon rubber beads being superior in heat resistance are used as the main constituent components of the elastic body, there is no fear that the elastic body is deteriorated, for example, even if the elastic body is heated in the hardening step. Accordingly, even when a bonding adhesive to be hardened at a comparatively high temperature is used, the elastic body can withstand the curing temperature sufficiently. As a result, the bonding adhesive can be hardened surely so that further higher product quality can be achieved.

This application is based on the Japanese Applications 2001-302175 filed on Sep. 28, 2001, 2001-233762 filed on Aug. 1, 2001, 2001-265826 filed on Sep. 3, 2001 and 2001-387637 filed on December 20, the contents of which are incorporated by references.

What is claimed is:

1. A method for manufacturing a structural body comprising:
   a structural body formation step of forming the structural body by combining a plurality of constituent members through a thermosetting bonding adhesive;
   a charging step of charging a flexible mandrel having substantially spherical silicon rubber beads into the structural body;
   a disposing step of disposing the structural body into a pressurizing or hearing unit;
   a hardening step of fixing or hardening the bonding adhesive through the flexible mandrel by the pressurizing or heating unit, wherein the hardening step comprises a heating step of holding the structural body in place with a predetermined jig, heating the structural body to thereby expand the flexible mandrel to apply pressing force from inside to outside the structural body while hardening the bonding adhesive; and
   a discharge step of discharging the flexible mandrel from the structural body.

2. The method for manufacturing a structural body according to claim 1, wherein the structural body comprises a plate-like body, a box-like body having an open portion and a plurality of plate-like members cooperatingly forming a bonding margin defining the open portion, and a closable access hole.

3. The method for manufacturing a structural body according to claim 1, wherein the flexible mandrel is constituted by beads that are only silicon rubber beads.

4. The method for manufacturing a structural body according to claim 2, wherein the flexible mandrel is constituted by beads that are only silicon rubber beads.

5. The method for manufacturing a structural body according to claim 1, wherein the flexible mandrel is constituted by a mixture of silicon rubber beads and glass beads.

6. The method for manufacturing a structural body according to claim 2, wherein the flexible mandrel is constituted by a mixture of silicon rubber beads and glass beads.

7. A method for manufacturing a structural body comprising:
a structural body formation step of forming a structural body by laminating a skin material on a lower mold jig;
a closed space formation step of disposing the structural body into a pressurizing or heating unit, forming a closed space defined by at least one of the structural body and the pressurizing or heating wit, disposing a flexible mandrel in a predetermined position on the skin material, the flexible mandrel being constituted by a bag body which has stretchability and heat resistance and is filled wit substantially spherical silicon rubber beads or a mixture of substantially spherical silicon rubber beads and glass beads as an elastic body;
a stiffener material disposition step of disposing a stiffener material on the skin material so as to cover the flexible mandrel;
an upper mold jig disposition step of disposing an upper mold jig on the skin material and the stiffener material; and
an evacuation step of evacuating the air of a space surrounded by the upper mold jig and the lower mold jig;
a hardening step of fixing or hardening the bonding adhesive through the elastic body by the pressurizing or heating unit, and heating the skin material and the stiffener material while evacuating the space; and
a discharge step of discharging the elastic body from the closed space, and
discharging the beads from the flexible mandrel.

8. The method for manufacturing a structural body according to claim 7, wherein the skin material includes a thermosetting resin film, and a fiber reinforced fabric material which is free from being impregnated with resin and which is disposed on the thermosetting resin film,
the stiffener material is a fiber reinforced fabric material which is free from being impregnated with resin, and
a suction port for evacuation in the evacuation step and the heating step is formed in a portion of the upper mold jig above the stiffener material.

9. The method for manufacturing a structural body according to claim 7, wherein the skin material and the stiffener material are fiber reinforced fabric materials which are free from being impregnated with resin, and the method further comprises:
a resin introduction step of introducing thermosetting resin into the space surrounded by the lower mold jig and the upper mold jig so as to impregnate the thermosetting resin into the skin material and the stiffener material, the resin introduction step being carried out during the evacuation step and the heating step.

10. The method for manufacturing a structural body according to claim 7, wherein the skin material and the stiffener material are prepregs including a fiber reinforced impregnated with thermosetting resin.

11. The method for manufacturing a structural body according to claim 7, wherein the skin material is a prepreg including a reinforced fiber impregnated with thermosetting resin, and
the stiffener material is a fiber reinforced resin component in which thermosetting resin has been hardened.

12. A method for manufacturing a structural body comprising:
a step of forming a structural body having a box-like body and a skin, the box-like body being formed to have an open portion with a flange in one side surface thereof and an access hole in another side surface thereof to be smaller than the open portion; the skin being bonded with the flange through the bonding adhesive so as to close the open portion; a pressure bag preparation step of preparing a pressure bag having an attachment portion and a bag body portion being superior in stretchability; and a pressure bag disposing step of disposing the bag body portion of the pressure bag into the box-like body, and fixing the attachment portion of the pressure bag into the access hole in a state where the attachment portion of the pressure bag is kept opening to an outside of the box-like body;
a step of disposing the structural body into a pressurizing or heating unit, and charging an elastic body comprising spherical bodies made of silicon rubber into the pressure bag;
a covering step of covering the structural body, which has the pressure bag, with a vacuum bag except the attachment portion of the pressure bag which is kept open to the atmosphere outside of the box-like body;
an evacuation step of evacuating the air of a portion surrounded by the vacuum bag;
a hardening step of fixing or hardening the bonding adhesive by applying atmospheric pressure to an interior of the box like body through the elastic body and to an exterior of the box-like body through the vacuum bag; and
a discharge step of discharging the elastic body from the pressure bag and discharging the pressure bag and the elastic body from the access hole.

13. The method for manufacturing a structural body according to claim 12, wherein the elastic body has substantially spherical silicon rubber beads as its main constituent components.

* * * * *